(12) United States Patent
Uludag et al.

(10) Patent No.: US 12,529,523 B2
(45) Date of Patent: Jan. 20, 2026

(54) HEATING BODY

(71) Applicant: Nejdet Uludag, Hamburg (DE)

(72) Inventors: Nejdet Uludag, Hamburg (DE);
Mustafa Ozelsagiroglu, Esenyurt Istanbul (TR)

(73) Assignee: Nejdet Uludag, Hamburg (DE)

( * ) Notice: Subject to any disclaimer, the term of this patent is extended or adjusted under 35 U.S.C. 154(b) by 659 days.

(21) Appl. No.: 17/777,825

(22) PCT Filed: Dec. 13, 2019

(86) PCT No.: PCT/EP2019/085116
§ 371 (c)(1),
(2) Date: May 18, 2022

(87) PCT Pub. No.: WO2021/115617
PCT Pub. Date: Jun. 17, 2021

(65) Prior Publication Data
US 2022/0412665 A1    Dec. 29, 2022

(30) Foreign Application Priority Data
Dec. 10, 2019    (DE) ..................... 10 2019 133 802.6

(51) Int. Cl.
*F28D 15/02*    (2006.01)
*F24D 3/02*    (2006.01)
(Continued)

(52) U.S. Cl.
CPC ..... *F28D 15/0266* (2013.01); *F24D 19/0087* (2013.01); *F24D 3/02* (2013.01); *F24D 13/04* (2013.01); *F24D 2200/08* (2013.01)

(58) Field of Classification Search
CPC ............ F28D 15/0266; F28D 1/05316; F28D 1/05365; F28D 1/0226; F24D 19/0087; F24D 3/02; F24D 13/04; F24D 2200/08
(Continued)

(56) References Cited

U.S. PATENT DOCUMENTS 4,567,351 A * 1/1986 Kitagawa ................ F24H 3/004
165/181
5,921,315 A    7/1999 Dinh
(Continued)

FOREIGN PATENT DOCUMENTS

CN    101533810 A    9/2009
CN    201309432 Y    9/2009
(Continued)

OTHER PUBLICATIONS

JP 2004-4353874A Machine Translation (Year: 2004).*
(Continued)

*Primary Examiner* — Len Tran
*Assistant Examiner* — Gustavo A Hincapie Serna
(74) *Attorney, Agent, or Firm* — Janet I. Cord

(57) ABSTRACT

A heating body, having multiple heat tubes filled with a working medium and run in parallel, and which have a first end and a second end, and having a heat source, which is thermally coupled to the first and/or second end of the heat tubes. To improve efficiency, reduce heating time, and achieve a homogeneous heat distribution, the first ends of the heat tubes are open and are fluidically connected to a first transverse connection tube and/or the second ends of the heat tubes are open and are fluidically connected to a second transverse connection tube, the heat tubes and the transverse connection tubes form a common cavity filled with the working medium, and the first or second transverse connec-
(Continued)

tion tube is thermally coupled to the heat source in order to absorb heat from the heat source.

9 Claims, 30 Drawing Sheets

(51) Int. Cl.
  *F24D 13/04*  (2006.01)
  *F24D 19/00*  (2006.01)
(58) Field of Classification Search
  USPC ...................................................... 165/104.21
  See application file for complete search history.

(56) References Cited

U.S. PATENT DOCUMENTS

| | | | | |
|---|---|---|---|---|
| 5,958,364 A * | 9/1999 | Dunne | ..................... | B01J 8/067 |
| | | | | 165/110 |
| 8,180,205 B2 | 5/2012 | Yao | | |
| 9,464,850 B2 * | 10/2016 | Iino | ....................... | F28F 9/0253 |
| 9,791,190 B2 * | 10/2017 | Hanafusa | ............. | F28F 9/0209 |
| 2003/0177775 A1 * | 9/2003 | Wanami | ................... | F25B 39/04 |
| | | | | 62/196.4 |
| 2004/0022529 A1 | 2/2004 | Lamb | | |
| 2004/0057707 A1 * | 3/2004 | Lamb | ................... | F28D 1/0226 |
| | | | | 392/394 |
| 2004/0112073 A1 * | 6/2004 | Ito | ............................ | F25B 40/00 |
| | | | | 62/196.4 |
| 2004/0118150 A1 * | 6/2004 | Yamada | ................... | F25B 39/04 |
| | | | | 62/509 |
| 2007/0012428 A1 | 1/2007 | Wu et al. | | |
| 2007/0065123 A1 | 3/2007 | Yao | | |
| 2008/0000629 A1 * | 1/2008 | Viczena | ................... | F24F 11/83 |
| | | | | 165/260 |
| 2009/0000577 A1 * | 1/2009 | Miyagawa | ................ | F01N 5/02 |
| | | | | 123/41.2 |
| 2009/0241573 A1 * | 10/2009 | Ikegami | ............. | B60H 1/00342 |
| | | | | 62/238.7 |
| 2010/0078425 A1 * | 4/2010 | Wang | ...................... | F24H 3/004 |
| | | | | 219/538 |
| 2011/0030403 A1 * | 2/2011 | Kondou | .................... | F25B 5/04 |
| | | | | 62/515 |
| 2012/0031586 A1 * | 2/2012 | Sugimura | ............... | F25B 39/04 |
| | | | | 165/104.21 |
| 2016/0010929 A1 * | 1/2016 | Takahashi | ................. | F28D 9/02 |
| | | | | 165/166 |
| 2016/0298890 A1 * | 10/2016 | Esformes | ............ | F28D 1/05341 |
| 2017/0122669 A1 * | 5/2017 | Takahashi | ................. | F28F 3/08 |
| 2017/0184355 A1 * | 6/2017 | Wang | ...................... | F28F 27/02 |
| 2017/0205128 A1 * | 7/2017 | Onaka | ...................... | F25B 49/02 |
| 2017/0336114 A1 | 11/2017 | Lee et al. | | |
| 2020/0300515 A1 * | 9/2020 | Sun | ......................... | F25B 39/00 |
| 2021/0016628 A1 * | 1/2021 | Kozasa | ............... | H01M 10/613 |

FOREIGN PATENT DOCUMENTS

| | | | | |
|---|---|---|---|---|
| CN | 101603790 A | * | 12/2009 | |
| CN | 102589198 A | * | 7/2012 | ............. F25B 39/04 |
| CN | 204202453 U | | 3/2015 | |
| CN | 105651090 A | | 6/2016 | |
| DE | 20 2007 015 734 U1 | | 3/2008 | |
| FR | 2 391 426 A1 | | 12/1978 | |
| FR | 2 654 808 A1 | | 5/1991 | |
| GB | 2099980 A | * | 12/1982 | ........... F28D 1/0226 |
| JP | S58 60135 A | | 4/1983 | |
| JP | 61-149010 U | | 9/1986 | |
| JP | 63046344 A | | 1/1992 | |
| JP | 04203891 A | | 7/1992 | |
| JP | H 6-3302 Y | | 1/1994 | |
| JP | 07083582 A | | 3/1995 | |
| JP | 08152283 A | | 6/1996 | |
| JP | 10274488 A | | 10/1998 | |
| JP | 11351769 A | | 12/1999 | |
| JP | 2003130378 A | | 5/2003 | |
| JP | 2004322914 A | * | 11/2004 | ........... F28D 1/0443 |
| JP | 2004332975 A | | 11/2004 | |
| JP | 2004353874 A | * | 12/2004 | ........... F28D 1/0226 |
| JP | 20044353874 A | * | 12/2004 | |
| JP | 2008002793 A | * | 1/2008 | ......... F28D 15/0266 |
| JP | 2012202609 A | * | 10/2012 | ........... F28D 7/0025 |
| KR | 10-2005-0099941 | | 10/2007 | |
| KR | 20-2010-0003501 | | 4/2010 | |
| KR | 10-2015-028468 | | 3/2015 | |
| WO | WO-2015083297 A1 | * | 6/2015 | ............ F24F 1/0059 |

OTHER PUBLICATIONS

Machine Translation CN101603790A (Year: 2009).*
Machine Translation JP2004353874A (Year: 2004).*
CN 101603790A Machine Translation (Year: 2009).*
Korean Office Action, dated Oct. 31, 2024, corresponding to KR Application No. 10-2022-7022637.
International Search Report, dated Nov. 18, 2020, corresponding to International Application No. PCT/EP2019/085116.
China Office Action and Search Report for Application No. 201980102893.1, mailed on Feb. 15, 2025, 9 pages.
Japanese Office Action dated Sep. 24, 2025 for application JP 2024-074853.

* cited by examiner

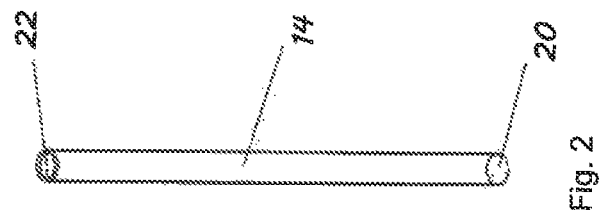
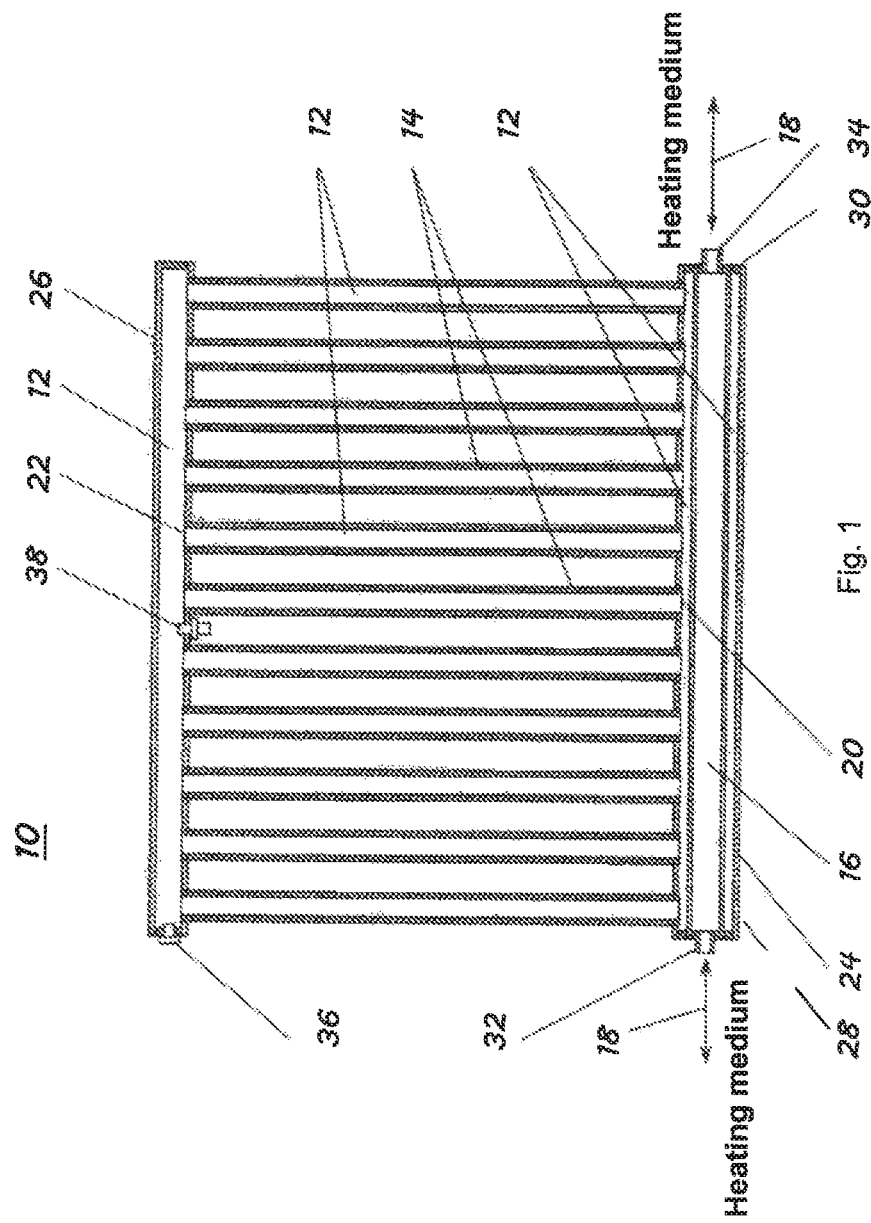

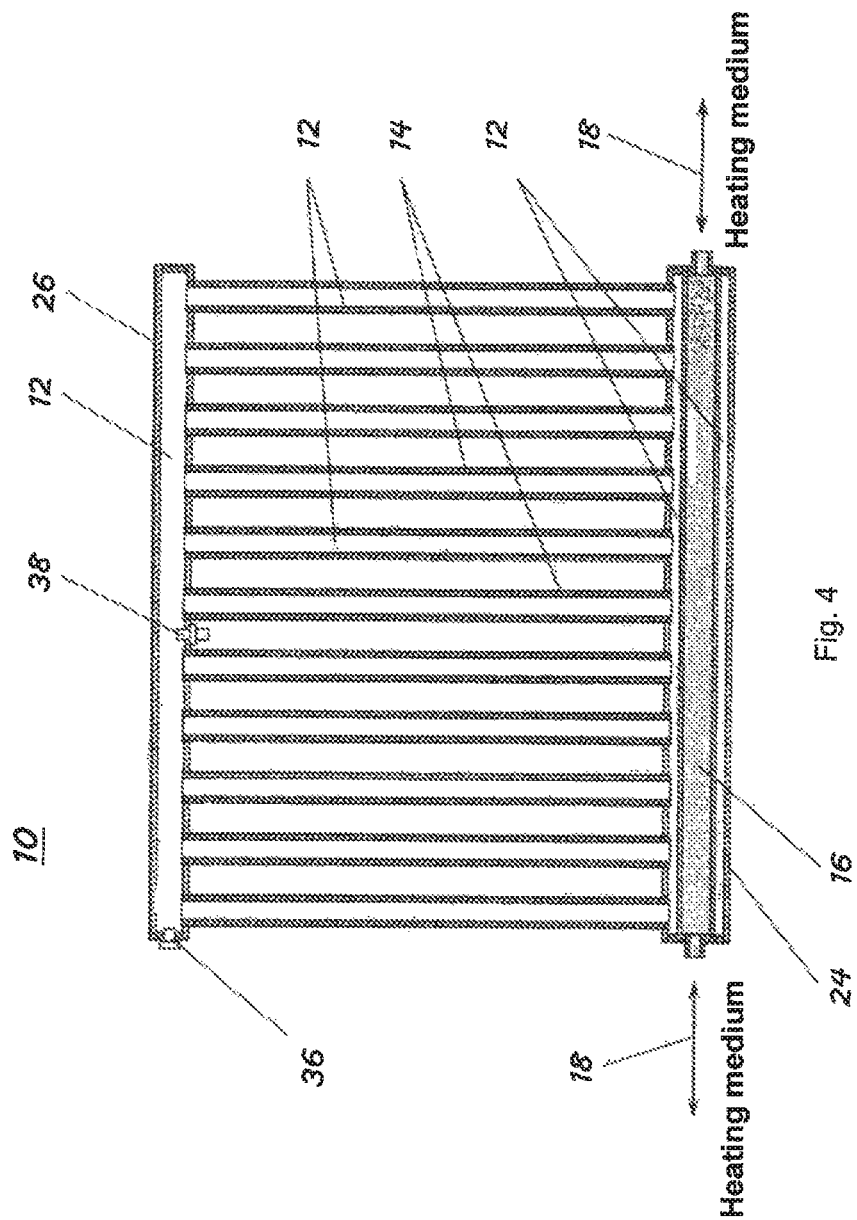

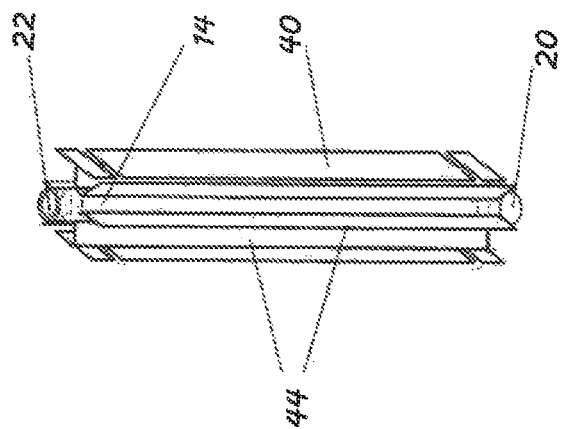
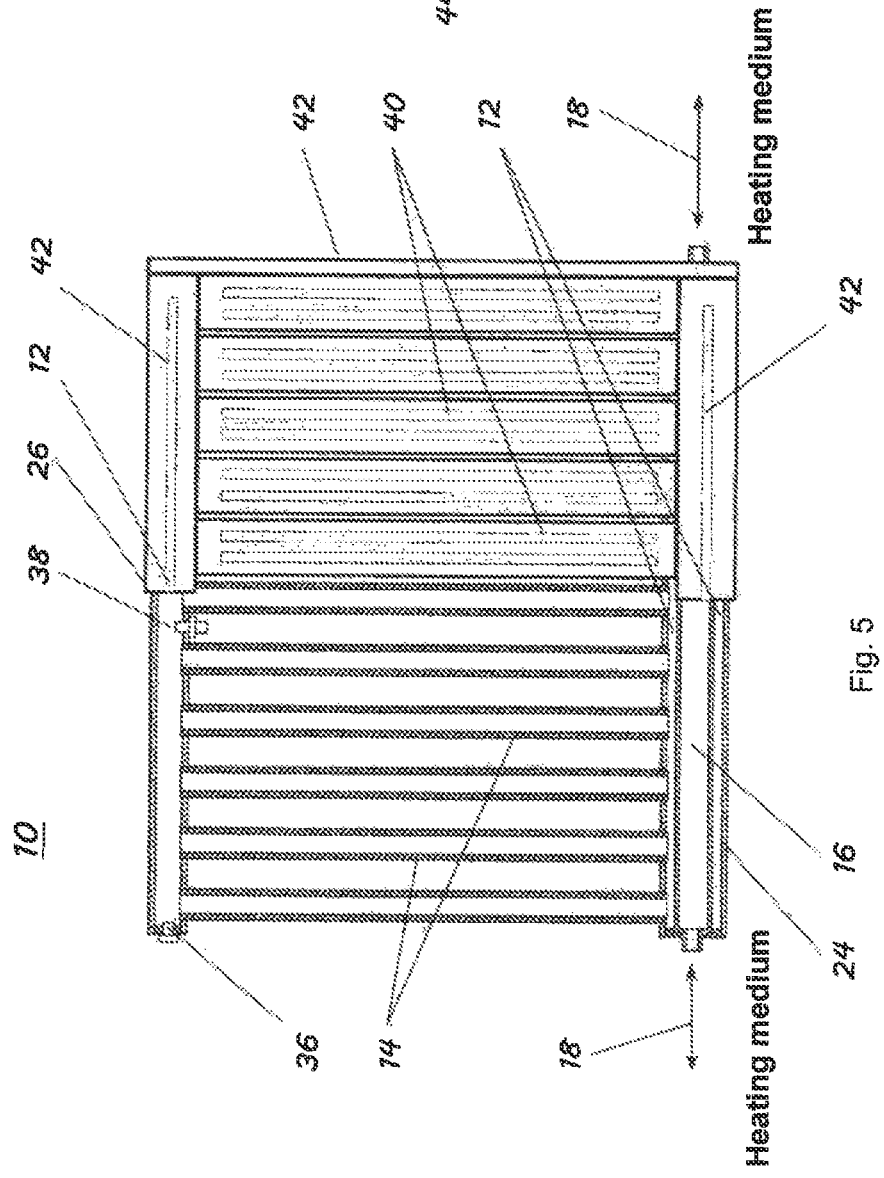

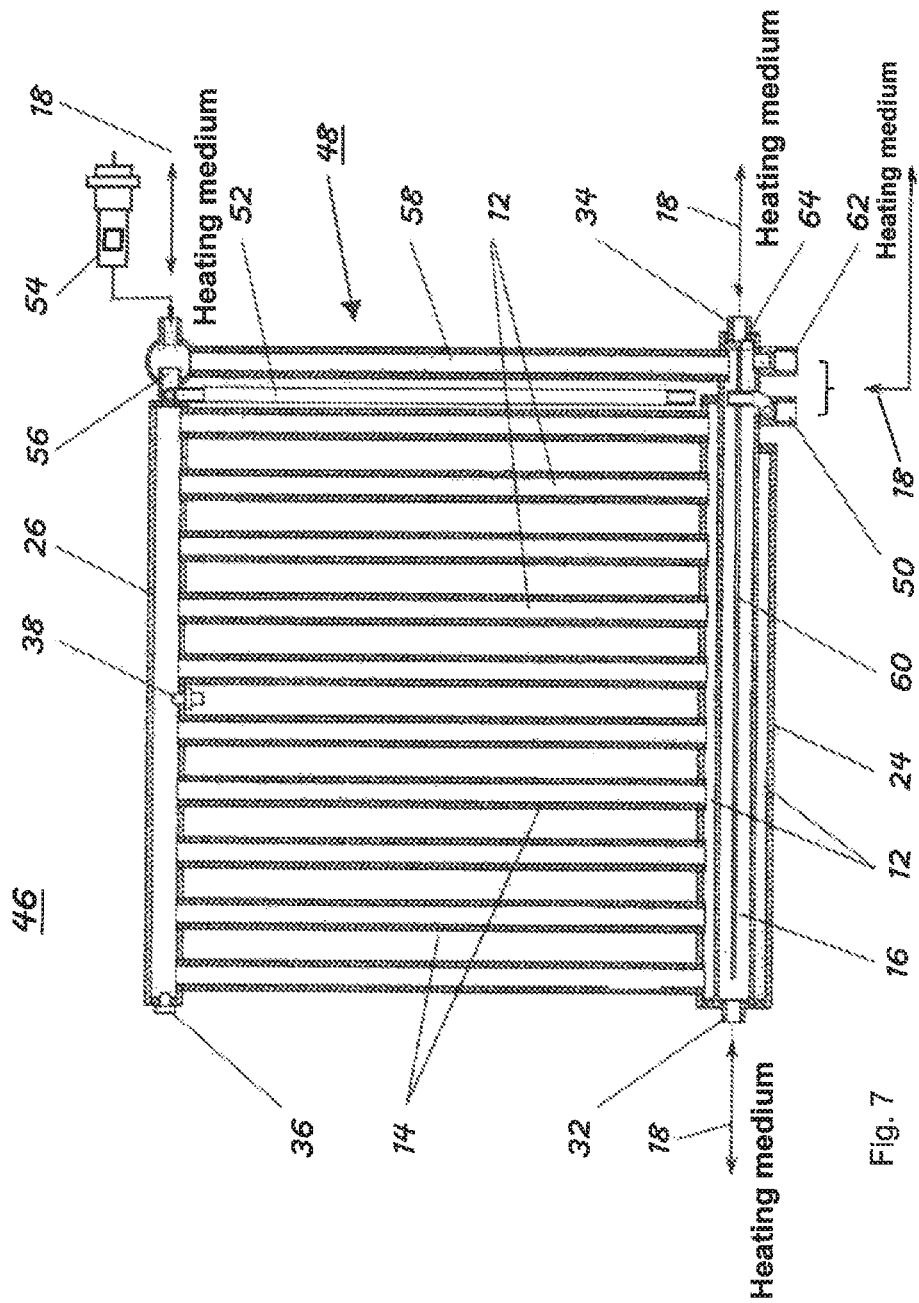

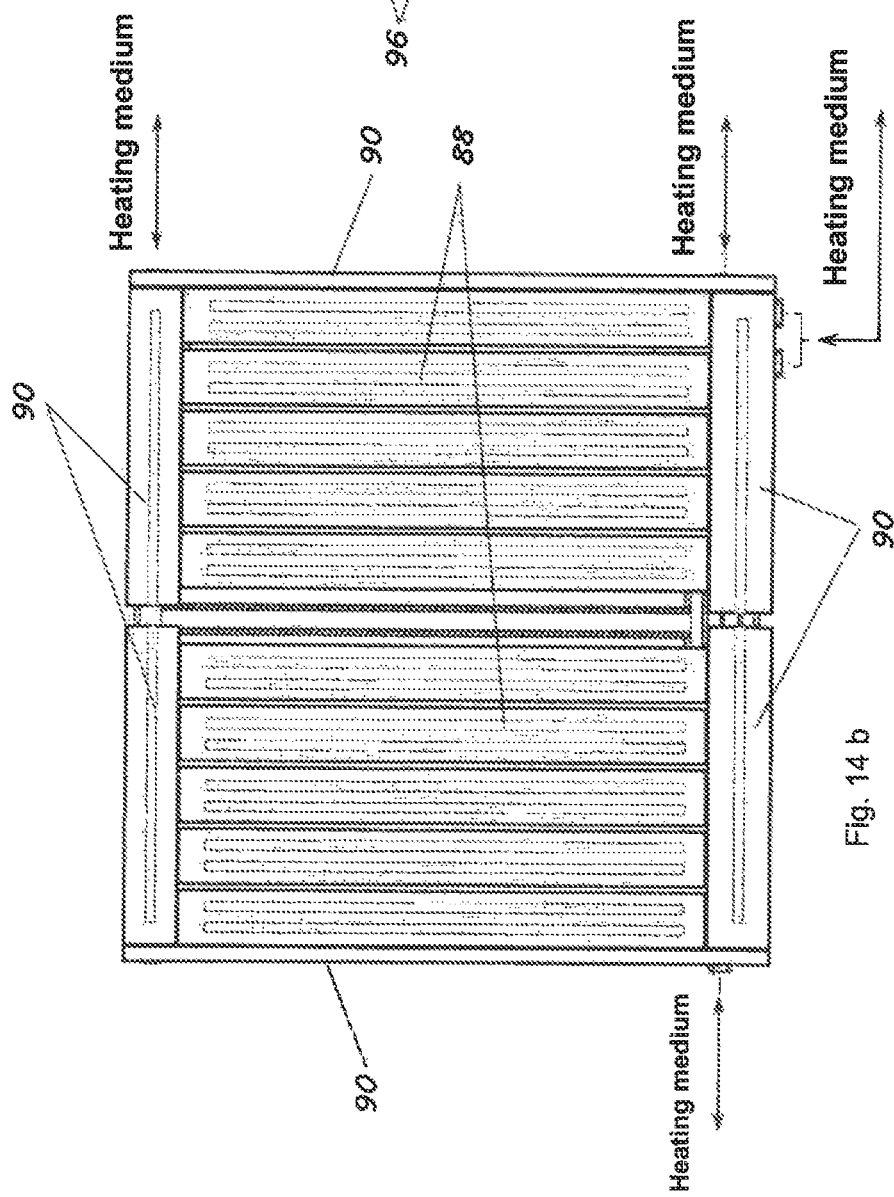

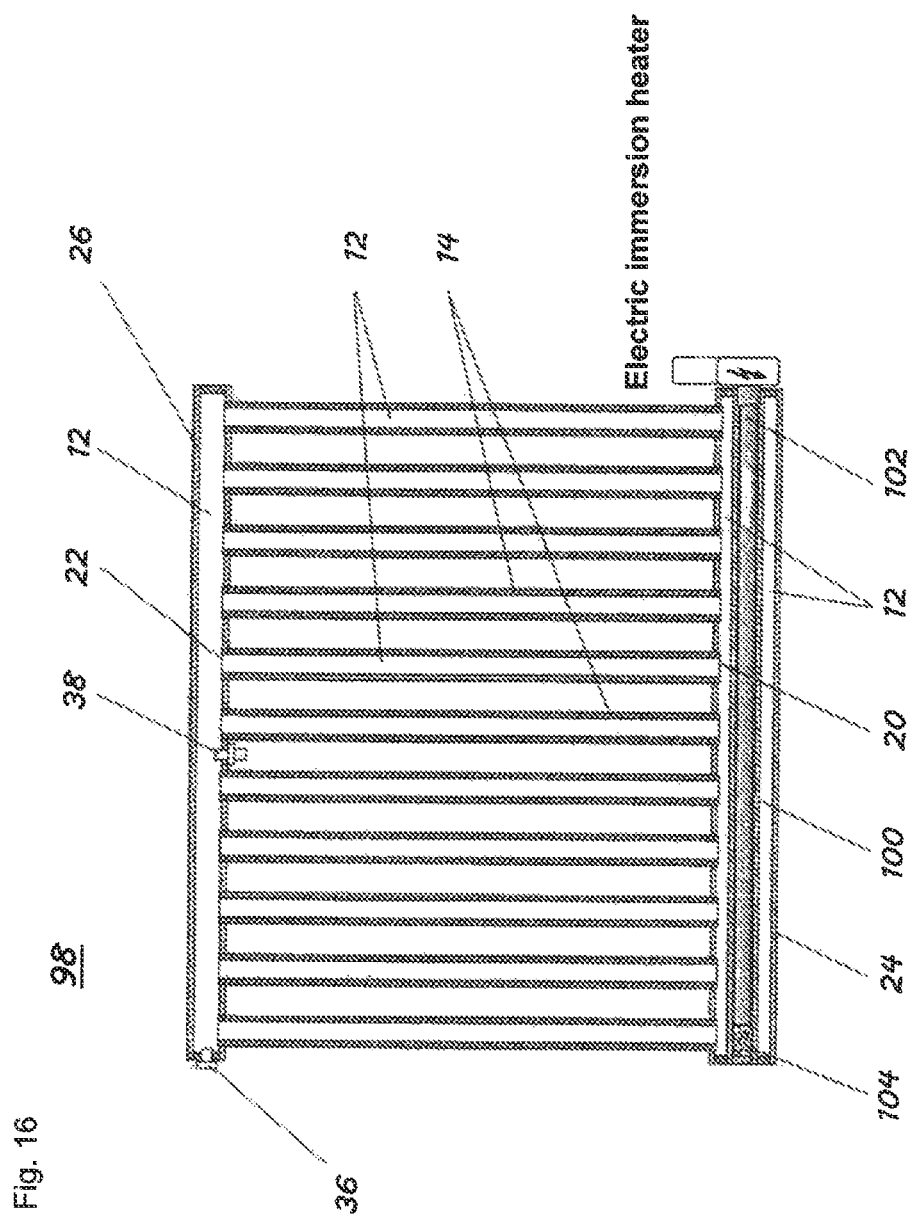

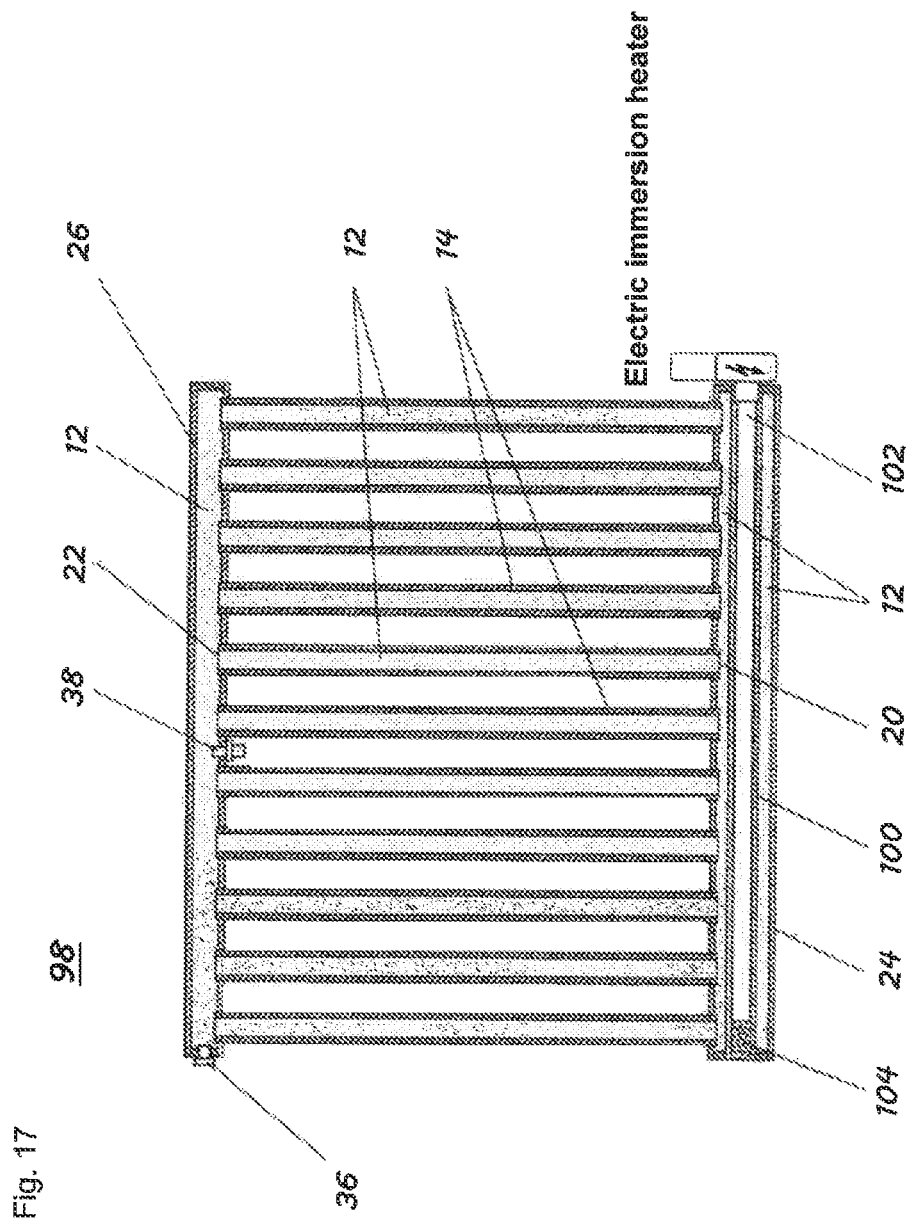

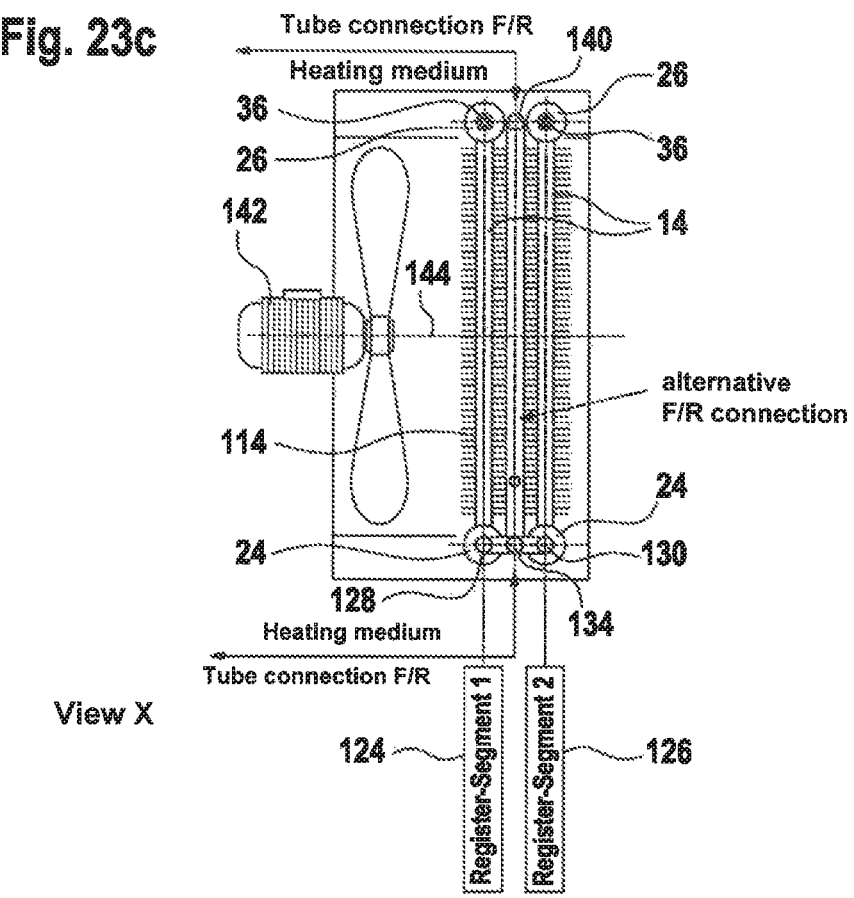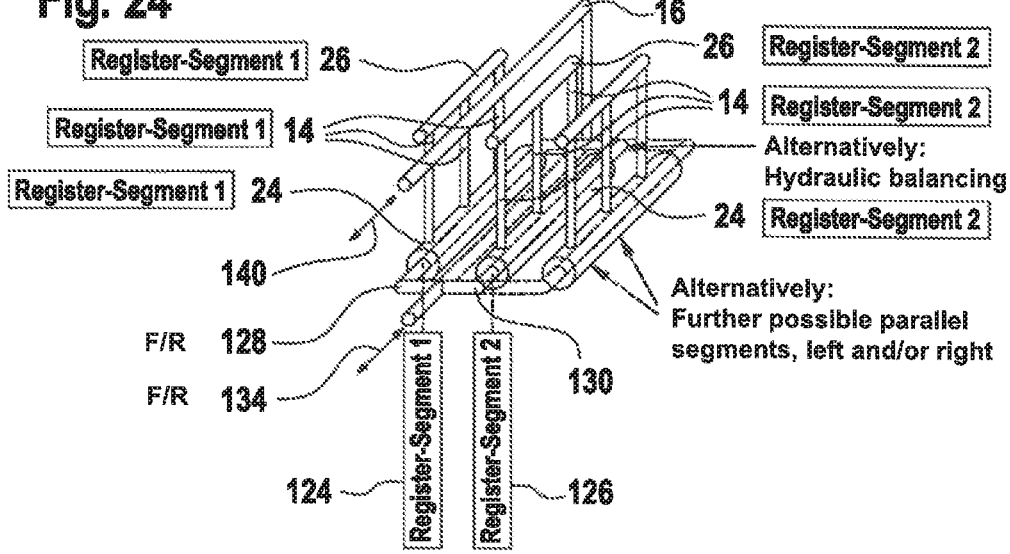

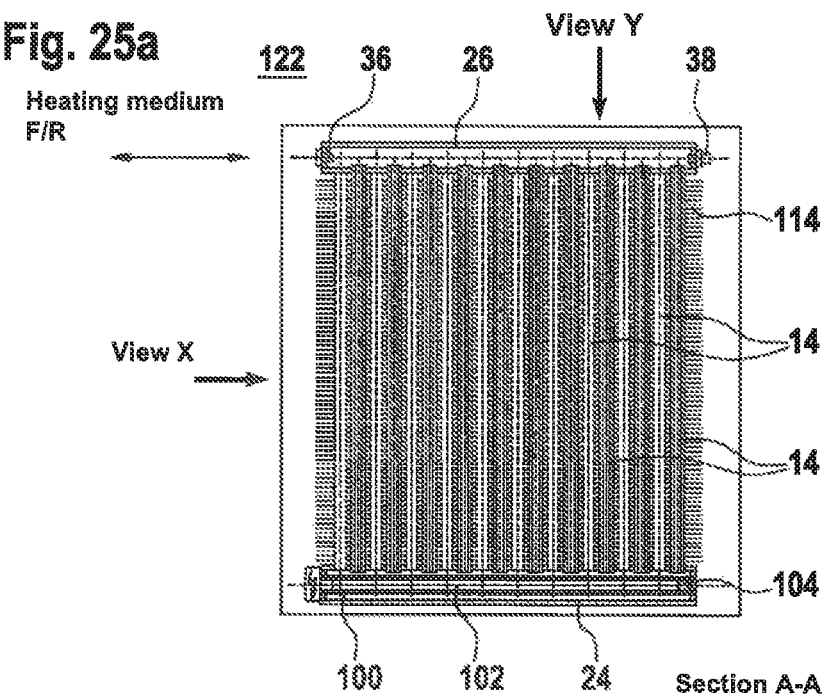
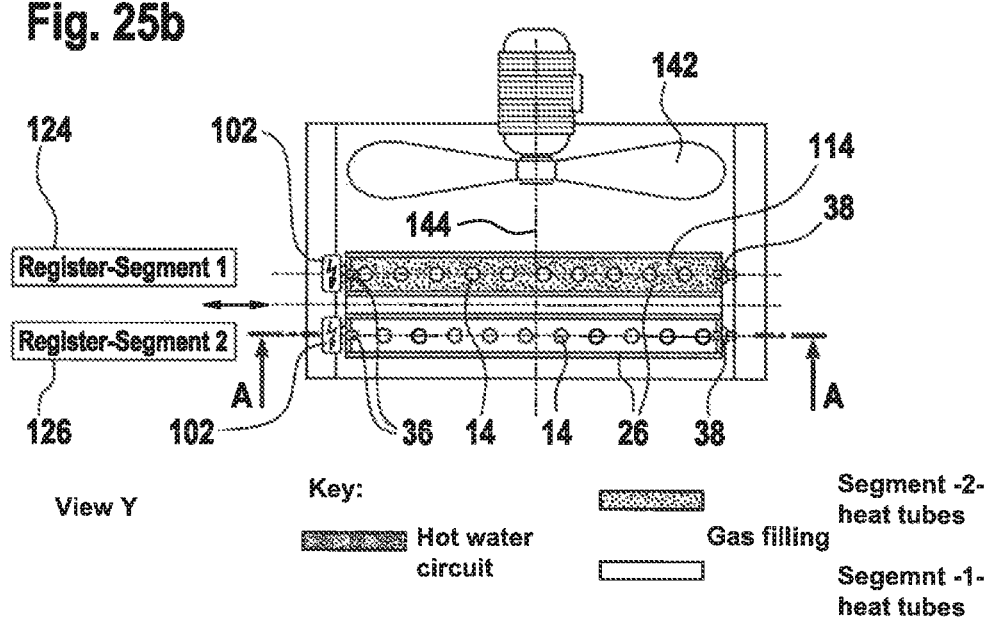

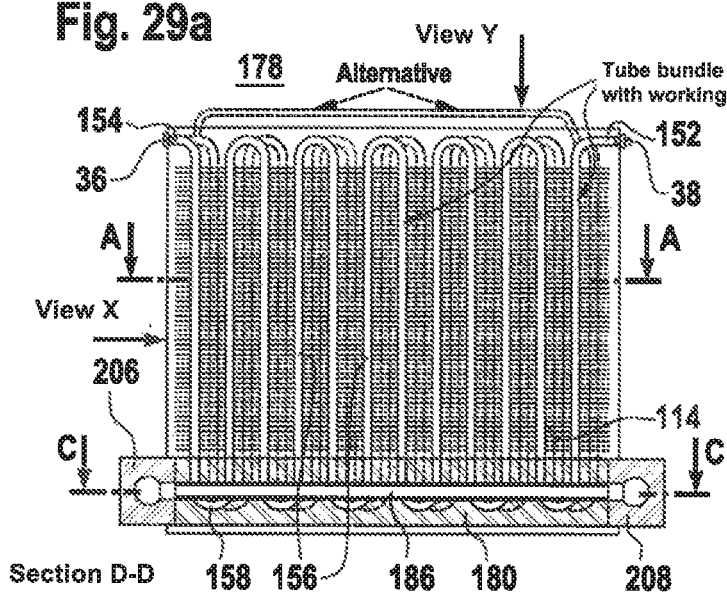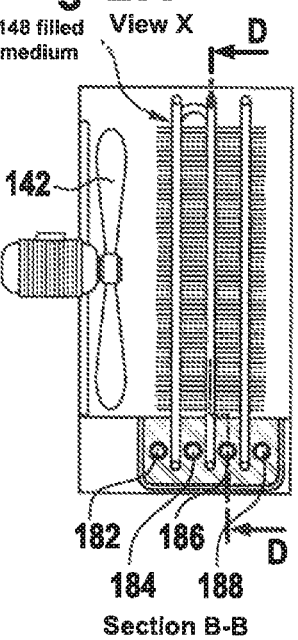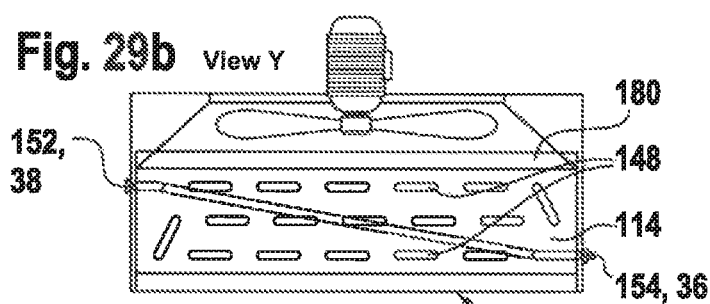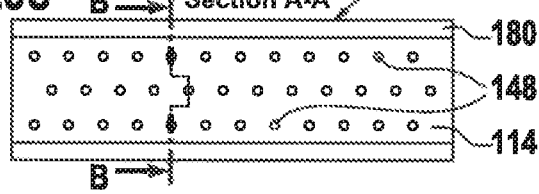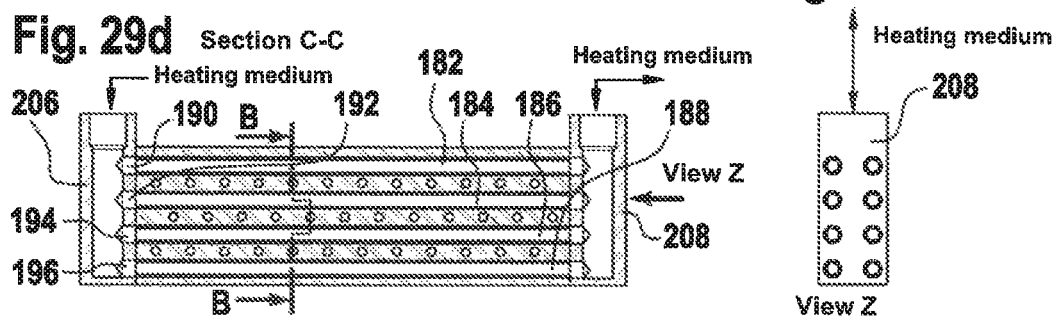

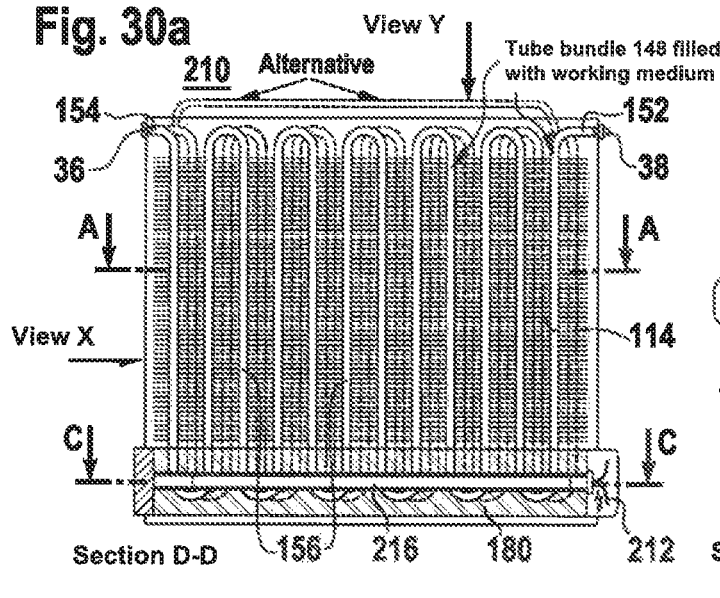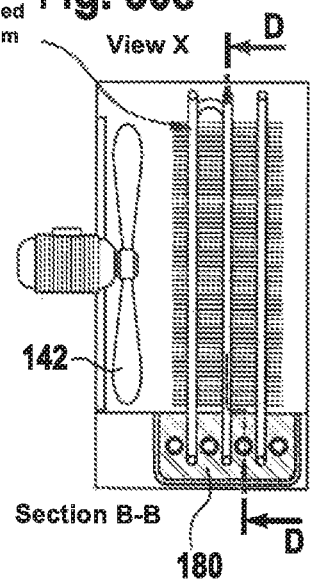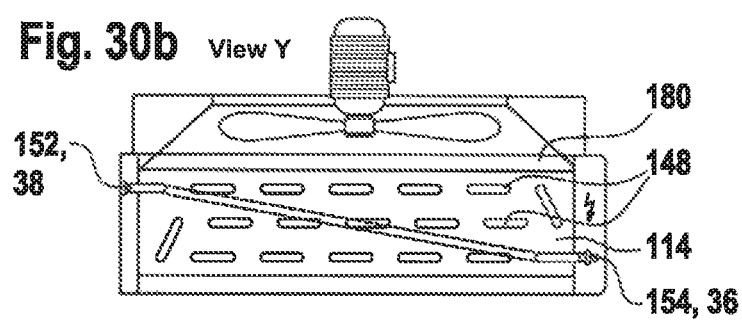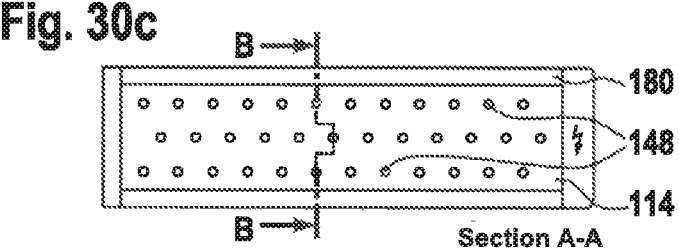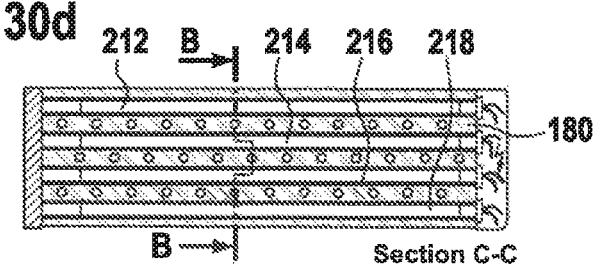

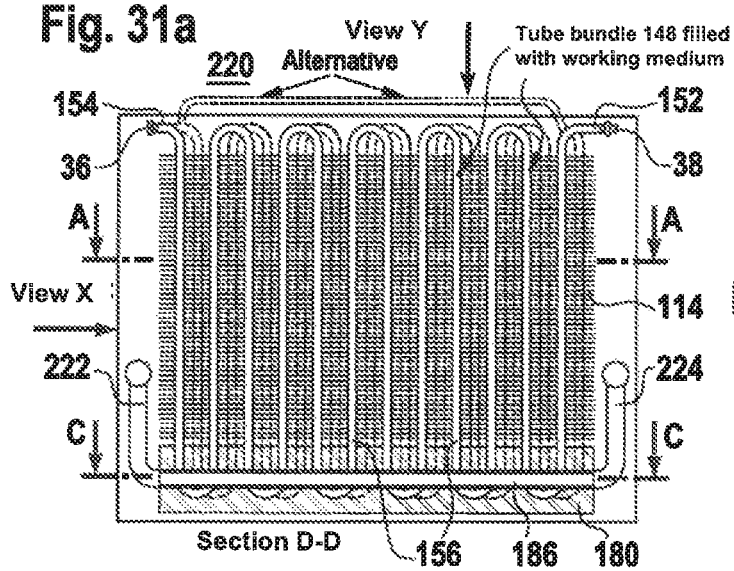
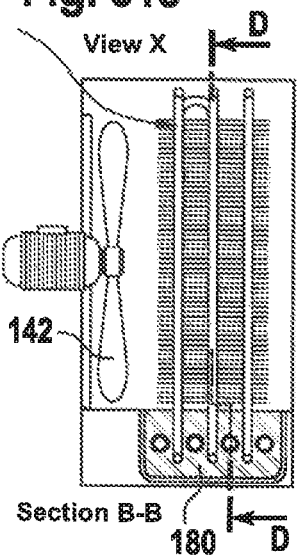
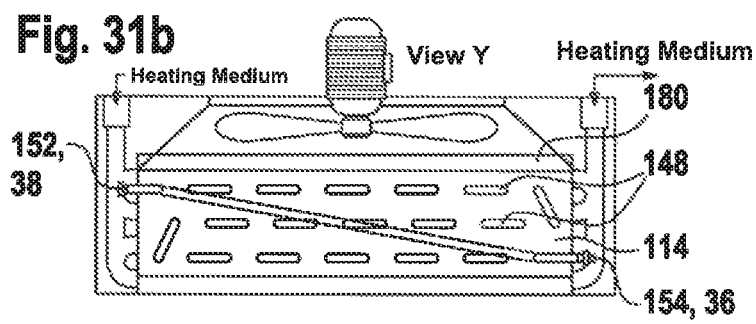
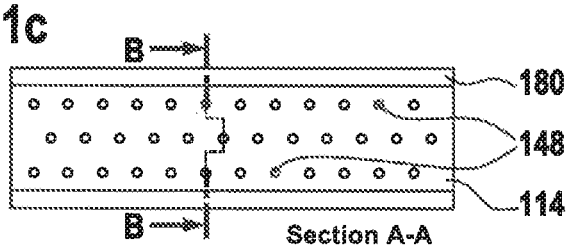
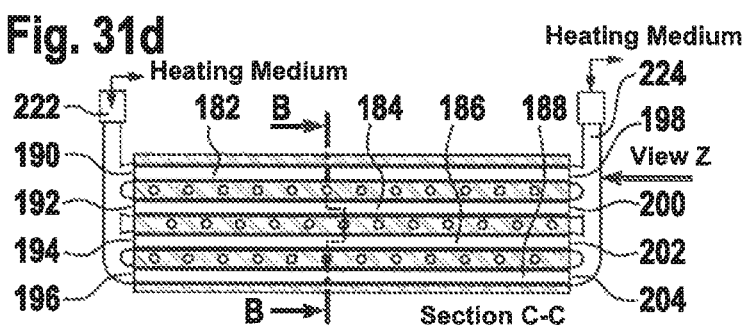
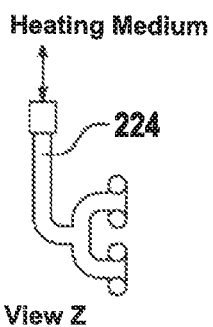

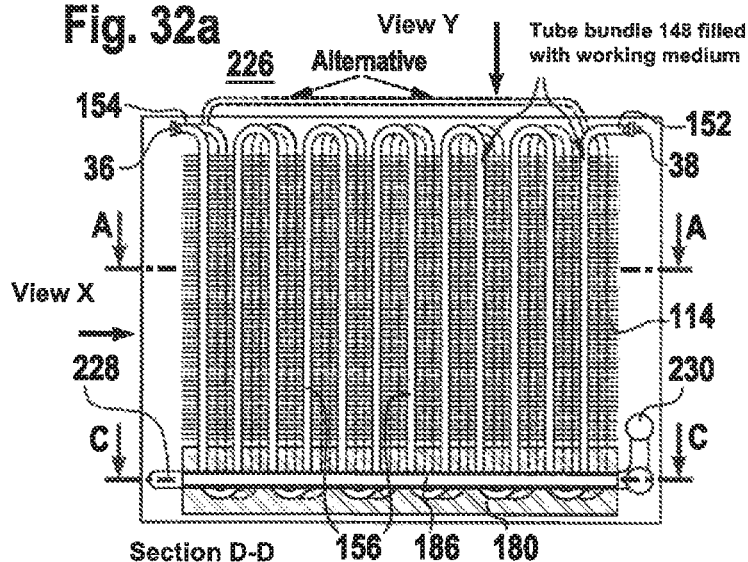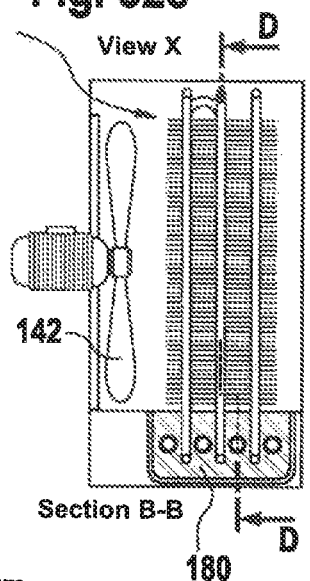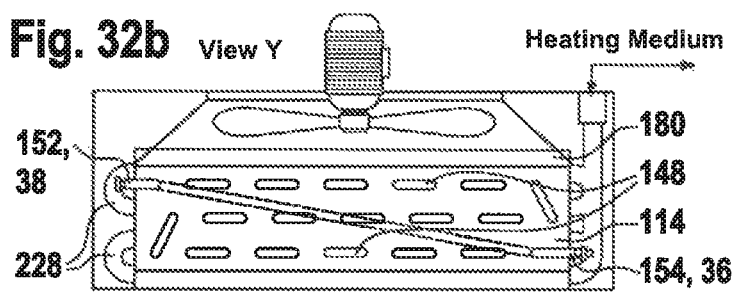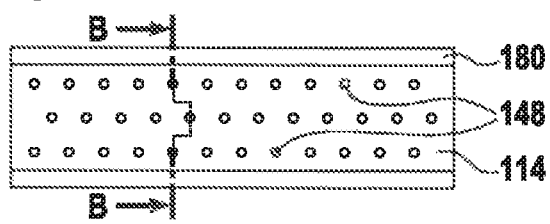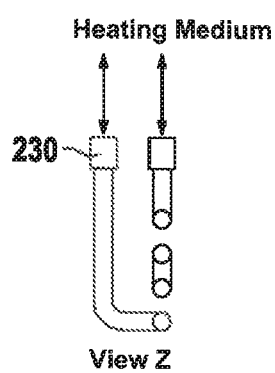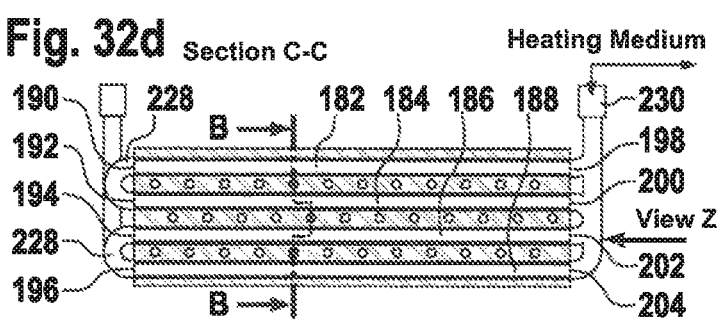

HEATING BODY

The invention relates to a heater having multiple heat tubes and a heat source thermally coupled to the heat tubes.

A heater of the type stated at the outset is known from DE 20 2007 015 734 U1. A multi-part heater consists of a vertically arranged heated front panel and several closed hollow sections vertically arranged on the rear of the front panel, connected in heat-conducting manner to the front panel and at a distance from one another and filled with refrigerant. The ends of the hollow sections project from the front panel on one side and are mounted in a horizontal carrier section tube located underneath the front panel and flowed through by the heating medium. The carrier section tube comprises at least one inlet connector and at least one outlet connector, as well as openings for heat-conducting and positive mounting of the ends of the hollow sections. The heated front panel, including the hollow sections connected in heat-conducting manner to the front panel, can accordingly be separated from the carrier section tube without shutting off and draining the heating medium.

In the known embodiment, the hollow sections are designed as individual elements and closed at the ends.

EP 1 307 698 B1 relates to a heater comprising a substantially vertical heatpipe being connected to at least one additional heatpipe tube which extends therefrom in a substantially horizontal direction and is rotatably arranged thereon. At least one of the heatpipes is at least partially drained and has an inner cavity for receiving an operating fluid. Furthermore, at least one of the heatpipes is suitable to receive heat from an inner or outer heat source.

Various heater types are known for room heaters with hot water as the heat carrier. Depending on their design and operation, the hot water heaters are subdivided into convector heaters, sectional heaters, tubular heaters and panel heaters.

The aforementioned hot water heaters differ substantially in their design and in the manner heat is emitted, in the form of radiation and/or convection. The manner of heat emission into the room is of crucial importance for the room climate. The higher the proportion of radiation heat, the more pleasant the heating comfort or feeling of comfort.

Convection heat is generated by heating up cold air along heater surfaces, thereby increasing air and dust circulation inside the room. By contrast, only solid bodies, objects, walls, furniture and/or any type of mass including biological mass are heated by radiation heat (wavelength in the infrared range). Gases such as room air are also heated up by IR radiation, but substantially less so than by convection heat, with the result being that practically no dust is raised by radiation heat.

Passive convectors are heaters by which colder ambient air is heated by water-carrying cavities, e.g. tubes, provided with fins. Local heating at the mostly vertical fin surfaces inevitably creates an vertical air circulation. The fins increase the heat-emitting surface area of the materials enclosing the cavities. Tubes and fins can be made from thermally conductive materials.

Active convectors are heaters by which the air to be heated is forced past the water-carrying tubes provided with fins by means of at least one fan and heated them. Tubes and fins can also be made from thermally conductive metals. Typical forms are for example heating registers.

Sectional heaters consist of joined-together individual sections. The heat is emitted predominantly by convection, preferably ¾ as convection heat and ¼ as radiation heat. Heater sections are made from thermally conductive metals such as steel or cast iron.

Tubular heaters consist of adjacently arranged tubes without fins that are connected fluid-tight at their ends to connecting tubes that are parallel in each case. The efficiency approximately matches that of sectional heaters, with ¾ of the heat being emitted as convection heat and ¼ of the heat as radiation heat. Heater sections are made of thermally conductive materials, mainly of steel, copper and/or aluminum. A typical form are for example towel holders.

The panel heater is a standard form among heaters. It is welded from panel halves in which water ducts/cavities have been pre-formed. The water-carrying cavities are designed more planar inside the heater. This makes the ratio of heat transfer surface area to water volume more favorable than with a sectional heater. However, the panel heater needs less hot water than a sectional heater with the same heat output, the panel heater being about 30% more economical than the sectional heater. Depending on design, the panel heater emits 50 to 70% radiation heat and 30 to 50% convection heat.

The convection proportion is increased by parallel and vertical arrangement of convection fins (ribs) on the welded panel chamber. The heat output can be varied by parallel panel bodies that are connected fluid-tight.

The heat carrier for the previously described heaters is hot water. The design or the type determines the water volume with a comparable heat yield or capacity. The heat radiation in particular from panel heaters is not always evenly distributed over the panel surface. It is partly dependent on the type and position of the connections of the flow and/or return pipe. A general distinction is made between same-end, opposite-end, bottom-opposite and/or top-opposite connections. Special designs such as single-pipe connection and central connections are also known.

In the case of same-end and/or opposite-end connections, it is generally known that this connection combination does not exert any influence on the heat output of hot water heaters. With bottom-opposite and top-opposite connections, an output reduction of up to 15% must be taken into account. The heat output of heaters is also substantially determined by the design, the dimensions, the hot water flow temperature, the water volumetric flow and/or the positions of the flow and/or return connections. Heating bodies are also prone to a so-called "thermal inertia".

Heating cost allocators for consumption-based calculation of heating costs must be positioned at standardized and predetermined points of sectional, tubular or panel heaters. Heating costs are determined for "convection-only" heaters by heat flow meters inside the water circuit.

Based on this, the object underlying the present invention is to improve heaters of the type stated at the outset such that the effectiveness is improved, the time for heating up is shortened and a homogeneous heat distribution is achieved.

This object is solved in accordance with the invention as described herein.

In accordance with the invention, it is provided that the first ends of the heat tubes are designed open and are fluidically connected to a first transverse connection tube and/or that the second ends of the heat tubes are designed open and are fluidically connected to a second transverse connection tube, the heat tubes and the transverse connection tubes forming a common cavity filled with the working medium, and that the first or second transverse connection tube is thermally coupled to the heat source to receive heat from the heat source.

Due to the connection of the first/second open ends of the heat tubes by means of transverse connection tubes, heat equalization takes place between the individual heat tubes, thus achieving a more homogeneous temperature distribution compared with heaters according to the prior art. In comparison to hot water heaters according to the prior art, the heat yield is increased by the invention. The water volume in the heater cavities can also be reduced, and hence the circulating water volume too. Furthermore, it was found that the radiated heat-emitting surfaces, ribs and/or fins attain their specified temperature more quickly.

Determining the position of heating cost metering devices can be simplified by the homogeneous temperature distribution. In particular, the heat output is constant, regardless of the type of connection. With the design in accordance with the invention, that rapid heating up of the heat-radiating surfaces, a homogeneous heat distribution of the radiating surfaces, ribs and/or fins, a rapid control response regardless of the type of connection, and an energy cost saving of to 40% compared to conventional heaters are achieved.

A preferred embodiment provides that the heat tubes are arranged parallel to one another and extend vertically in the operating position. In this version, the heat tubes are designed preferably as gravity heat tubes.

The working medium is preferably a commercially available and freely accessible refrigerant and/or refrigerant mix (zeotropic mix), with a GWP (Global Warming Potential) value below 2500 or a GWP value below 750 from the group-HFCs and/or PFCs and/or suitable refrigerants.

In a further preferred embodiment, it is provided that the first, lower transverse connection tube is connected to the heat source and forms an evaporator for the working medium, while the second, upper transverse connection tube forms a condenser for the working medium.

To improve the radiation of heat, it is provided that the heat tubes and/or the transverse connection tubes have heat-radiating elements along the longitudinal direction, such as planar elements, ribs and/or fins.

The planar elements of the individual heat tubes and/or transverse connection tubes are preferably in one plane.

The heat source is preferably a heating tube through which a gaseous or liquid heating medium, such as water, can flow. The heating tube is arranged coaxially in the first or second transverse connection tube along a longitudinal axis and is surrounded by the working medium.

Connectors for flow and return of the heating tube are preferably connected in pressure-tight and fluid-tight manner to the transverse connection tube at the end face.

Alternatively, the heating tube can also extend parallel or substantially parallel to the first or second transverse connection tube and be thermally coupled thereto.

To adapt the heater in accordance with the invention to different connection types, it is provided that the heating tube has a flow and a return, the flow being connected via a first bypass tube to a preferably commercially available control valve which is coupled to a connector extending from an end face of the second transverse connection tube, and that a second bypass tube extending from the control valve preferably parallel to the first bypass tube, is in fluidic connection to the heating tube and is coupled to the return.

In this embodiment, it is additionally provided that a flow separating device for regulating the flow rate of the heating medium, such as water, is arranged in the heating tube. The flow separating device can extend coaxially in the longitudinal direction of the heating tube from an aperture arranged in an end-face opening of the heating tube, a connection type of the heater being presettable by means of the aperture.

Alternatively, it is provided that the heat source is an electric heat source, such as an electric immersion heater. The electric immersion heater is preferably received in a tube which is thermally coupled to the first or second transverse connection tube and is preferably surrounded at least in some sections by the working medium. The electric heat source has the advantage that the heat radiation-emitting surfaces, ribs and/or fins reach their specified temperature more quickly. The heater temperature and hence the room temperature can also be regulated more quickly.

A particularly preferred embodiment is characterized in that the first and/or second transverse connection tube is designed as a double-walled tube structure, the tube for receiving the immersion heater being an inner tube of the double-walled tube structure and inserted into the transverse connection tube in a positive connection with at least one end-face opening for the immersion heater, and preferably connected fluid-tight and pressure-resistant.

To improve the heat transfer between the electric immersion heater and the inner tube, it is provided that the electric immersion heater is preferably thermally coupled to the tube or inner tube of the first or second transverse connection tube using a heat-conducting agent, such as a heat-conducting paste.

The heat-radiating elements coupled to the heat tubes are preferably designed as convector fins extending transversely to the heat tubes, or planar elements extending parallel to the tubes.

Two or more heaters can also be connected parallel or in series to a heating register.

Advantageously, the heater/heating register can be coupled to a fan whose flow direction is at right angles to a plane formed by the heater. This allows air to be conveyed through the convector fins to improve the heat emission.

An alternative design relates to a heater comprising at least one heat tube evacuated and filled with a working medium and having a first and a second end, and a heat source thermally coupled to the heat tube.

In accordance with the alternative invention, it is provided that the heat tube is bent into a meander-shaped tube bundle, comprising straight and parallel sections and upper and lower curved sections connecting the parallel sections, the lower or upper curved sections of the tube bundle being thermally coupled to the heat source.

A particularly preferred embodiment provides that the ends of the tube bundle are connected to one another in fluid-tight manner.

For efficient thermal coupling, it is provided that the lower curved sections of the tube bundle each form an evaporator and are thermally coupled to a heat-conducting body which is thermally coupled to the heat source.

The heat-conducting body is preferably made from a heat-conducting material, such as copper or aluminum.

The tube bundle is preferably a gravity heat tube bundle.

The heat source can be a heating tube passing through the heat-conducting body and flowed through by a heating medium, such as water.

Alternatively, the heat source can be an electric heat source, preferably an electric immersion heater, which is thermally coupled to the heat-conducting body.

The vertical sections of the tube bundle preferably have heat-conducting fins or convector fins extending transversely or longitudinally to the vertical sections.

The tube bundles can be connected parallel or in series to a heating register, with the lower curved sections being received in a common heat-conducting body.

Further details, advantages and features of the invention can be gathered not only from the claims and in the features to be found therein—singly and/or in combination—but also from the following description of a preferred example.

The drawing shows in:

FIG. 1 a sectional view of a first embodiment of a heater with heat tubes,

FIG. 2 a perspective view of a heat tube of the heater according to FIG. 1,

FIG. 3 a sectional view of a heater according to FIG. 1 filled with a working medium, FIG. 4 a sectional view of the heater according to FIG. 1 filled with a heating medium, FIG. 5 a front view of the heater according to FIG. 1, partly in section, with planar heat-radiating elements, FIG. 6 a heat tube of the heater according to FIG. 5 with planar heat-radiating element as a radiator, shown rotated by 90°, FIG. 7 a sectional view of the heater according to FIG. 1 preferably made of steel with a connecting device, comprising flow and return and bypass tubes for universal connection, FIG. 8 a sectional view of the heater according to FIG. 1 preferably made of aluminum with a connecting device, comprising flow and return and bypass tubes for universal connection, FIG. 9 a sectional view of the heater according to FIG. 7 filled with working medium, FIG. 10 a sectional view of the heater according to FIG. 8 filled with working medium, FIG. 11 a sectional view of the heater according to FIG. 7 filled with heating medium, FIG. 12 a sectional view of the heater according to FIG. 8 filled with heating medium, FIG. 13 a sectional view of the heater according to FIG. 8 preferably made of aluminum with a connecting device, comprising flow and return and bypass tubes for bottom-opposite connection and bottom-right connection, FIG. 14a a front view of the heater according to FIG. 7 or 8 with a first embodiment of heat-radiating elements as an example, FIG. 14b a front view of a heater according to FIG. 7 or 8 with an alternative embodiment of heat-radiating elements as an example, FIG. 15 a heat tube of the heater according to FIG. 14 with heat-radiating elements in the form of ribs as a radiator, shown rotated by 90°, FIG. 16 a sectional view of a second embodiment of a heater with electric heat source in the form of an electric immersion heater, FIG. 17 a sectional view of the heater according to FIG. 16 filled with working medium, FIG. 18 a front view of the heater according to FIG. 16, partly in a sectional view, with electric immersion heater as heat source and as an example covered by heat-radiating elements on the right-hand side, FIG. 19 a sectional view of a third embodiment of a heater in the form of a heating register with fins as heat-radiating elements, FIG. 20 a sectional view of the heater according to FIG. 19 filled with working medium, FIG. 21 a sectional view of the heater according to FIG. 19 filled with heating medium, FIG. 22 a sectional view of a fourth embodiment of a heater in the form of a heating register with electric immersion heater as heat source, FIG. 23a a sectional view of a heater with two heating registers according to FIG. 20 in parallel connection, FIG. 23b a plan view of the heater according to FIG. 23a, FIG. 23c a side view of the heater according to FIG. 23a, FIG. 24 a schematic view of the heating register heater according to FIGS. 23a-c, FIG. 25a a sectional view of a heater with two heating registers according to FIG. 22 in parallel connection, with electric immersion heaters as heat source, FIG. 25b a plan view of the heater according to FIG. 25a, FIG. 25c a side view of the heater according to FIG. 25a, FIG. 26 a schematic view of the heating register heater according to FIGS. 25a-c, FIG. 27 a sectional view of a fifth embodiment of a heater in the form of a meander-shaped heat tube bundle with heat source in the form of a heating tube, FIG. 28 a sectional view of a sixth embodiment of a heater in the form of a meander-shaped heat tube bundle with heat source in the form of an electric immersion heater, FIG. 29a a sectional view of an eighth embodiment of a heater in the form of a tube bundle heating register with three register segments, tube bundles in series connection, register segments in parallel arrangement, according to FIG. 27, heating medium tubes in parallel connection, FIG. 29b a plan view of the tube bundle heating register according to FIG. 29a, FIG. 29c a sectional view of the tube bundle heating register according to FIG. 29a along section A-A, FIG. 29d a sectional view of the tube bundle heating register according to FIG. 29a along section C-C, FIG. 29e a side view in section of the tube bundle heating register according to FIG. 29a along section B-B, according to FIG. 29c, d, FIG. 29f a side view of the tube bundle heating register according to FIG. 29d, FIG. 30a a sectional view of an ninth embodiment of a heater in the form of a tube bundle heating register according to FIG. 28, as an example with three register segments, tube bundles in series connection, register segments in parallel connection, with electric heat source, FIG. 30b a plan view of the tube bundle heating register according to FIG. 30a, FIG. 30c a sectional view of the tube bundle heating register according to FIG. 30a along section A-A, FIG. 30d a sectional view of the tube bundle heating register according to FIG. 30a along section C-C, FIG. 30e a side view in section of the tube bundle heating register according to FIG. 30a along section B-B according to FIG. 30c, d, FIG. 31a a sectional view of a tenth embodiment of a heater in the form of a tube bundle heating register, as an example with three register segments in parallel arrangement, tube bundle in series connection with preferably water as heat source, heating medium tubes in parallel connection, FIG. 31b a plan view of the tube bundle heating register according to FIG. 31a, FIG. 31c a sectional view of the tube bundle heating register according to FIG. 31a along section A-A, FIG. 31d a sectional view of the tube bundle heating register according to FIG. 31a along section C-C, FIG. 31e a side view and plan view of the tube bundle heating register according to FIG. 31a along section B-B according to FIGS. 31c, d, FIG. 31f a side view of the tube bundle heating register according to FIG. 31d, FIG. 32a a sectional view of an eleventh embodiment of a heater in the form of a tube bundle heating register according to FIG. 27, as an example with three register segments in parallel arrangement, tube bundle in series connection, heating medium tubes in series connection, FIG. 32b a plan view of the tube bundle heating register according to FIG. 32a, FIG. 32c a sectional view of the tube bundle heating register according to FIG. 32a along section A-A, FIG. 32d a sectional view of the tube bundle heating register according to FIG. 32a along section C-C, FIG. 32e a side view in section of the tube bundle heating register according to FIG. 32a along section B-B according to FIGS. 32c, d, FIG. 32f a side view of the tube bundle heating register according to FIG. 32d, FIG. 1 shows a heater 10 in a sectional view, comprising several heat tubes 14 evacuated and filled with a working medium 12 and extending parallel or substantially parallel, and a heat source 16 in the form of a heating tube flowed through by a heating medium 18, such as water, and which is thermally coupled to the heat tubes 14.

In accordance with the invention, the heat tubes 14 are designed as gravity heat tubes and each comprise first open ends 20 and second open ends 22. The first open ends open up into a first, closed transverse connection tube 24 and are connected fluid-tight thereto. The second open ends 22 open up into a closed, second transverse connection tube 26 and are in a fluid-tight fluidic connection thereto.

The cavities of the heat tubes 14 and of the transverse connection tubes 24, 26 form a uniform cavity which is evacuated and filled with the working medium 12. A non-inflammable, commercially available and freely accessible refrigerant mix such as for example from the group HFCs, hydrofluorocarbons, in a zeotropic mix is preferably used as the working medium. The pressure inside the heat tubes 14 and the transverse connection tubes 24, 26 is preferably 33 bar, depending on the heater surface temperature of up to 70° C. By means of a suitable working medium, temperatures can also be reached outside hot water heaters.

The transverse connection tube 24 receives the heating tube 16 in the coaxial direction, where the transverse connection tube is closed fluid-tight at its end faces 28, 30 and only connectors 32, 34 of the heating tube open up from the end faces 28, 30. In the second transverse connection tube, a filling valve 36 is preferably arranged on the end face, and a safety valve 38, for example, in the middle of a tube wall. The design also allows any other advantageous position of the safety valve in the transverse connection tube or the cavities filled with working medium. If technical guidelines so require, an advantageous safety encapsulation of the valve is provided. The first, lower transverse connection tube 24 forms substantially an evaporator (fluid collector) and the second, upper transverse connection tube 26 forms a condenser (vapor collector).

FIG. 2 shows the heat tube 14 in the form of a gravity heat tube in a simple design. The heat tubes 14 and the transverse connection tubes 24, 26 can be made of aluminum, copper, C-steel and/or VA-steel or other heat-conducting and solid materials and of a combination of various materials.

The heat tube 14 is a device used to convey heat, and to do so using a moving working medium, e.g. water, ammonia or refrigerant which evaporates and recondenses in a circuit. The working medium is initially liquid and is evaporated by the heating tube 16 in the first transverse connection tube 24 while absorbing heat, i.e. evaporation heat. The working medium then moves from the first open ends 20 through the heat tubes 14 to the second open ends 22, where it recondenses while emitting heat. The liquid then passes back to the first open ends or into the first transverse connection tube.

It must be noted here that the working medium substantially conveys not sensible heat, but latent heat. This means that there is hardly any temperature change, but instead evaporation or condensation, so that the evaporation heat or condensation heat respectively is transferred.

The tube structure in accordance with the invention made of transverse connection tubes and heat tubes surprisingly works as a two-phase thermosiphon. The circulation of the working medium requires a more or less vertical alignment of the heat tube in the thermosiphon, so that conveying of heat works only from bottom to top; so-called gravity heat tubes. The liquid working medium flows downwards due to gravity, in the present case to the first transverse connection tube (evaporator), while the medium evaporated there can rise to the second transverse connection tube (condenser). A relatively flat alignment is possible as long as the working medium can still flow dependably downwards. Since gravity is exploited by the thermosiphon, this is referred to as a gravity heat tube.

The previously described principle is also used in the following embodiments of various heaters.

FIG. 3 shows the heater 10 according to FIG. 1 in a sectional view, where a cavity formed by the heat tubes 14 and the transverse connection tubes 24, 26 is filled with the working medium 12, shown in gray.

FIG. 4 shows a side view of the heater 10, where the heating medium 18, such as water, flowing inside the heating tube 16 is shown in gray.

FIG. 5 shows the heater 10, partly in a sectional view and partly with covering elements 42 and radiating sheets 40 which are thermally coupled to the heat tubes 14 and transverse connection tubes 24, 26.

FIG. 6 shows in a perspective view the heat tube 14 with the planar heat-radiating element 40, which is thermally coupled to the heat tube 14 via connecting sheets 44 as convection elements. The heat-radiating elements 40, 44 are in one plane in the installed state and are preferably both on a front face and on a rear face of the heater.

FIG. 7 shows a second embodiment of a heater 46, preferably made of steel, with a connection system 48 adaptable to various heater connections. The connection system 48 comprises a flow connection 50 connected via a bypass tube 52 to an inlet of a preferably commercially available control valve 54, which is coupled to a docking tube end 56 extending from the second transverse connection tube 26. A second bypass tube 58 extends from the control valve 54 in the direction of the heating tube 16 and is in fluidic connection thereto. A heating medium flow divider 60, via which heating medium is passed from the second bypass tube 58 through the heating tube 16 and back to a return connection 62, is arranged coaxially inside the heating tube 16. The heating medium flow divider 60 extends from an aperture 64, which is arranged in an end-face cross-sectional surface of the heating tube 16 in order to operate the heater either via the connectors 32, 34 of the heating tube 16 or via the flow and return connections 50, 62.

FIG. 8 shows a third embodiment of a heater 66, preferably made of aluminum. This embodiment differs from the embodiment according to FIG. 7 in that the first transverse connection tube 24 and the heating tube 16 extend parallel next to one another and are thermally coupled. The first transverse connection tube 24 and the heating tube 16 are preferably designed as an extruded section 68, preferably an aluminum extruded section.

The heater 66 also comprises a universal connection system 70 with an inflow 72 connected via a first bypass tube 74 to a commercially available heater control valve 76 which is coupled to a docking tube end 78 of the second transverse connection tube 26. A second bypass tube 80 extends from the control valve 76 in the direction of the heating tube 16 and is in fluidic connection thereto. A heating medium flow divider 82 connected to an aperture 84 extends coaxially inside the heating tube 16, the aperture being arranged in an end-face opening of the heating tube 16. The heating medium is passed via the second bypass tube 80 along the heating medium flow divider 82 in the longitudinal direction of the heating tube and back to a return connection 86.

FIG. 9 shows the heater 46 made of steel filled with working medium, and FIG. 10 shows the heater 66 made of aluminum filled with working medium, in each case shown in gray.

FIGS. 11 and 12 each show the heater 46 and 66 filled with heating medium, in each case shown in gray.

FIG. 13 shows an embodiment of a heater 66 according to FIG. 8. This embodiment differs from the embodiment according to FIG. 8 in that the connection system 70 has an inflow 86 which is thermally coupled via a first bypass tube 74 to the second bypass tube 80 and to the return connection 72. The connection system also works when connection 72 is the flow and connection 86 the return. The heater is suitable only for "bottom-opposite connection" or "bottom connection", regardless of the flow direction (flow/return) of the heating medium 18.

FIGS. 14a and 14b show as examples various embodiments of the heater 46, 66 with planar heat-radiating elements 88, 92 which extend along the heat tubes 14, the bypass tube 58 according to FIG. 7 and the bypass tube 80 according to FIG. 8 and FIG. 13. The planar elements 90, 94 are examples of coverings.

FIG. 15 shows in a perspective view the heat tube 14 according to FIGS. 14a, b with the planar heat-radiating element 88, 92, which is thermally coupled to the heat tube 14 in the longitudinal direction via connecting sheets as convection elements 96. The heat-radiating elements 88, 92 and convection elements 96 are in one plane in the installed state and are preferably connected by joints both on a front face and on a rear face of the heater.

FIG. 16 shows in a sectional view a fourth embodiment of a heater 98 which has substantially the same structure as the heater according to FIG. 1, with identical elements being provided with the same reference numbers.

The first transverse connection tube 24 has, as shown in FIG. 1, along the central axis a coaxial tube 100 which in the example shown receives an electric immersion heater 102 in the longitudinal direction. To achieve an optimum heat transfer between the immersion heater 102 and the tube 100, it is provided that a heat-conducting agent 104 is preferably arranged between the immersion heater 102 and the tube 100. The tube 100 is connected at the end face fluid-tight to the transverse connection tube 24 and the working medium 12 flows around it on the outside.

The immersion heater connection is not restricted to the side shown in the figure, but can also be at the opposite tube end, with the required fluid seals as described above.

FIG. 17 shows the heater 98 filled with working medium 12, shown in gray.

FIG. 18 shows the heater 98, partly in a sectional view and partly with a covering in the form of planar heat-radiating elements 106 which extend in the longitudinal direction of the heat tubes 14. The planar elements 108, 109, 110 are examples of coverings.

FIG. 19 shows a fifth embodiment of a heater 112 which has substantially the same structure as the heater 10 according to FIG. 1, where however the heat tubes 14 are thermally coupled via transversely extending fins 114. Furthermore, a fan 116 is provided by which an air flow 118 can be passed through the openings forming between the fins 114.

Figure 22:
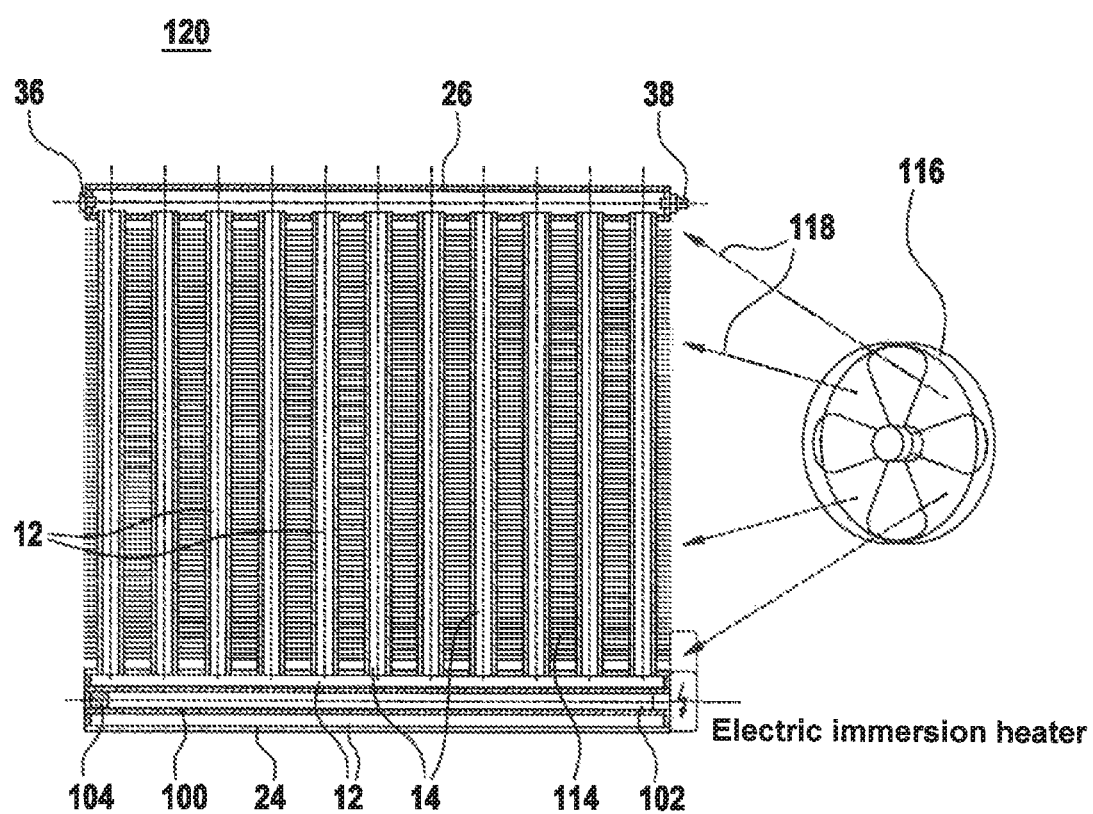

FIG. 22 shows a sixth embodiment of a heater 120 which has substantially the same structure as the heater 98 according to FIG. 16, where however the heat tubes 14 are thermally coupled via transversely extending fins 114. Furthermore, a fan 116 is provided by which an air flow 118 can be passed through the openings forming between the fins 114.

Figure 3:
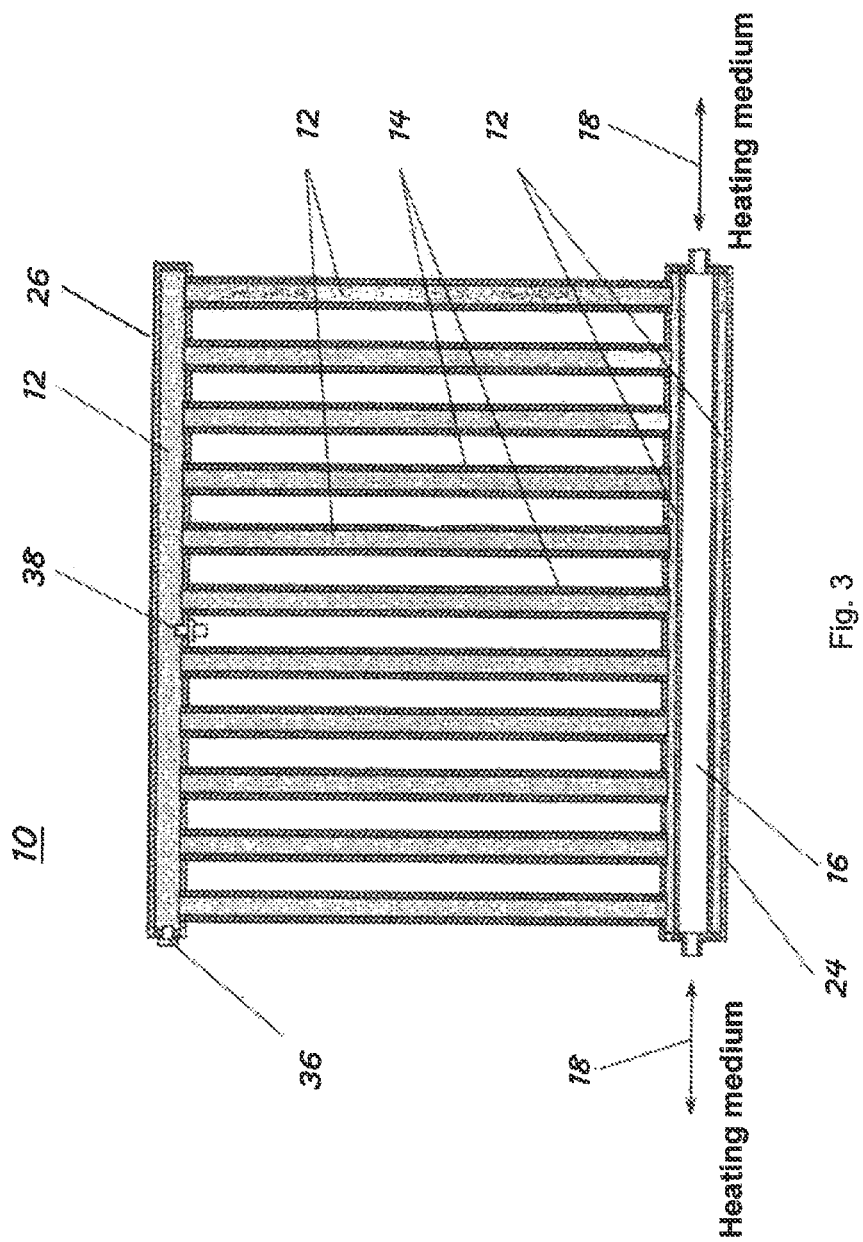
Figure 8:
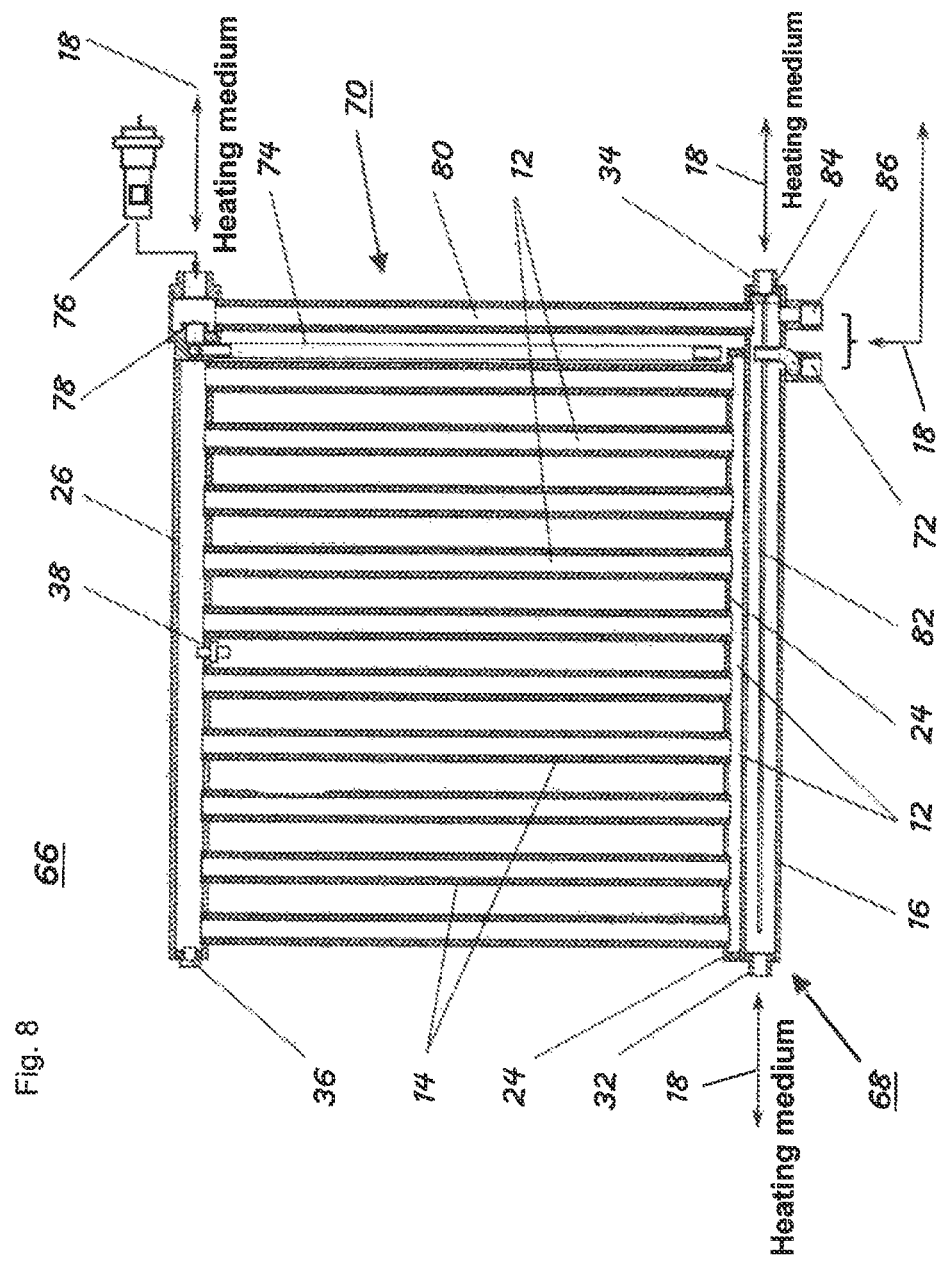
Figure 9:
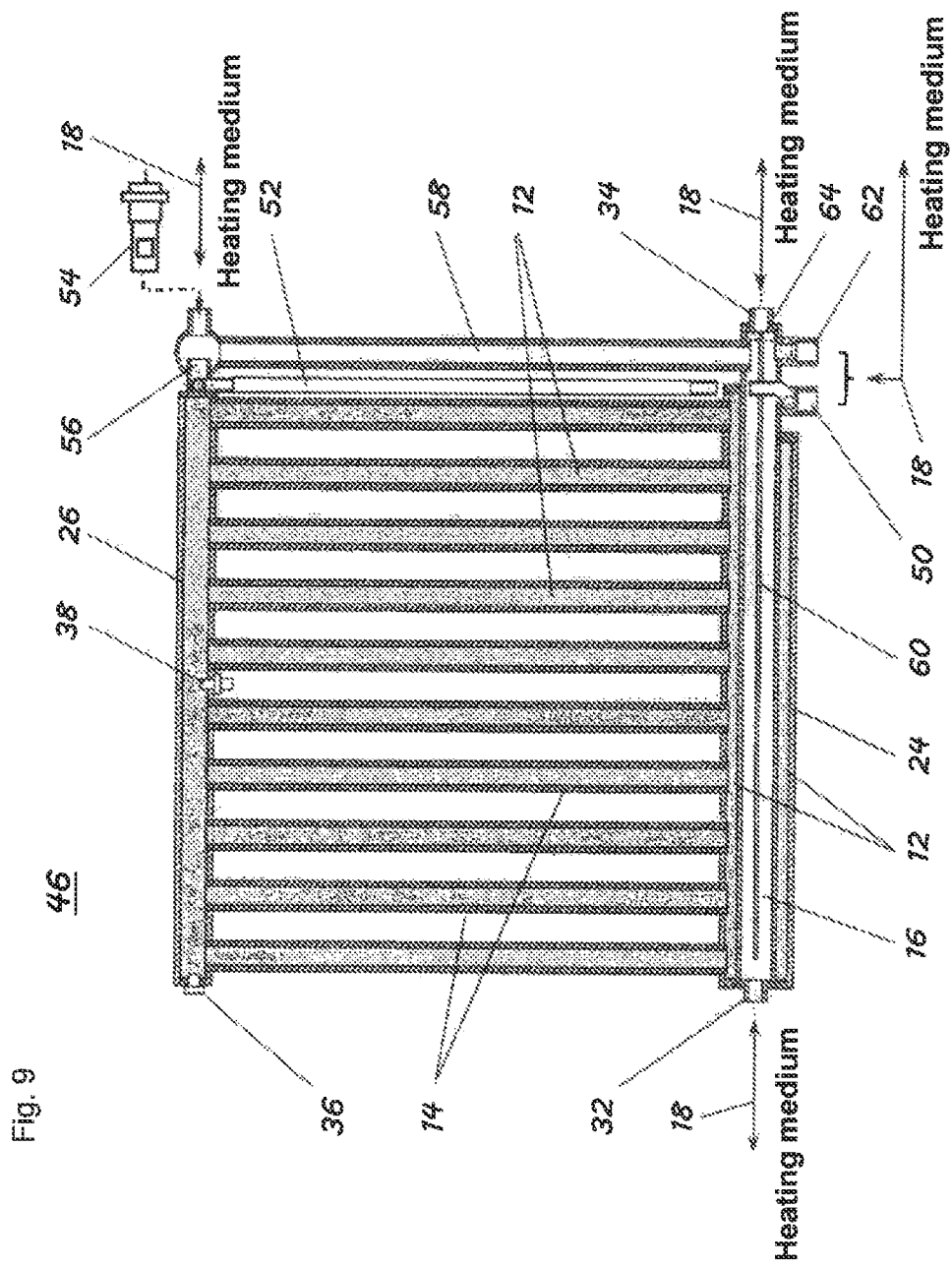
Figure 10:
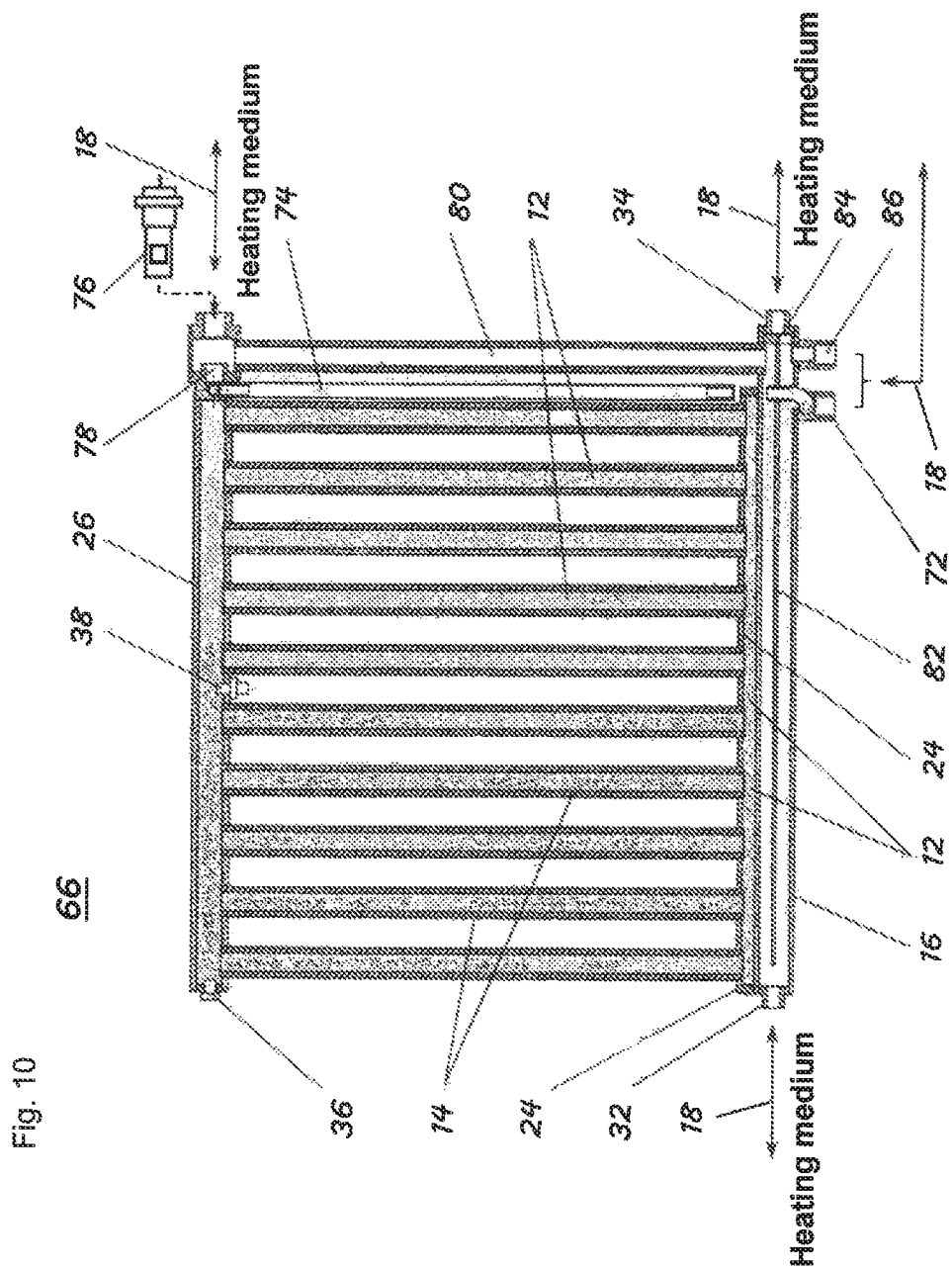
Figure 11:
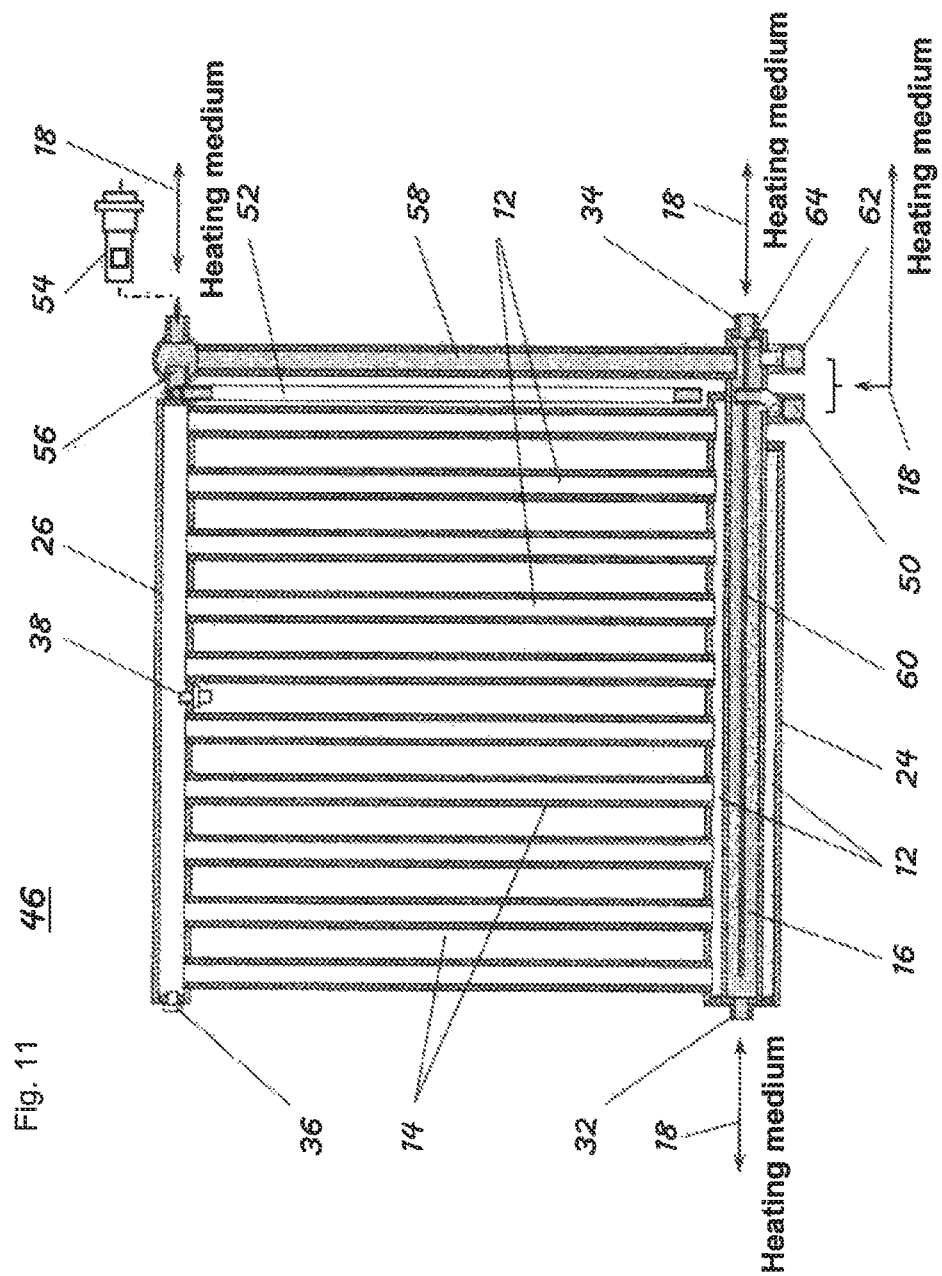
Figure 12:
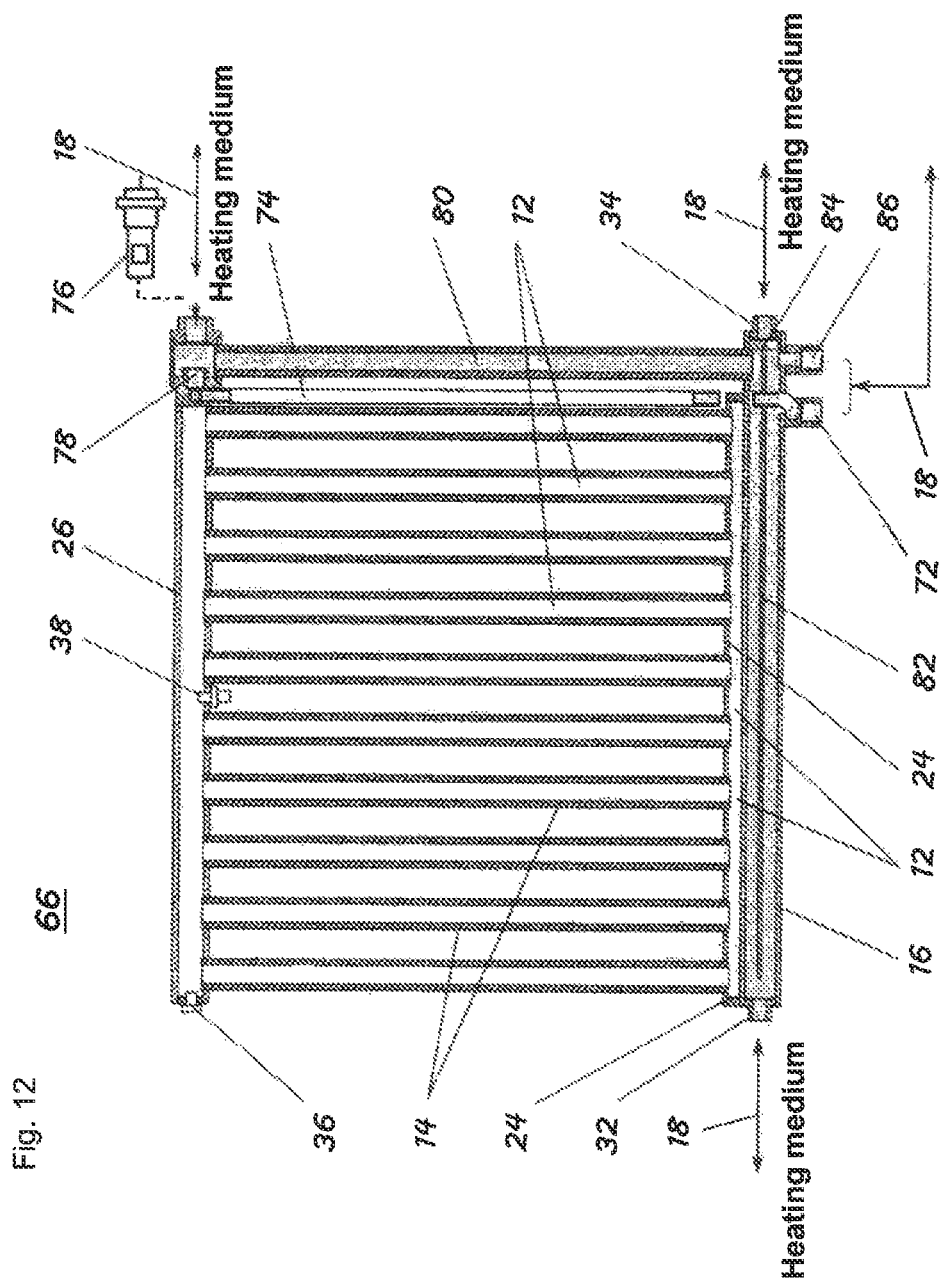
Figure 13:
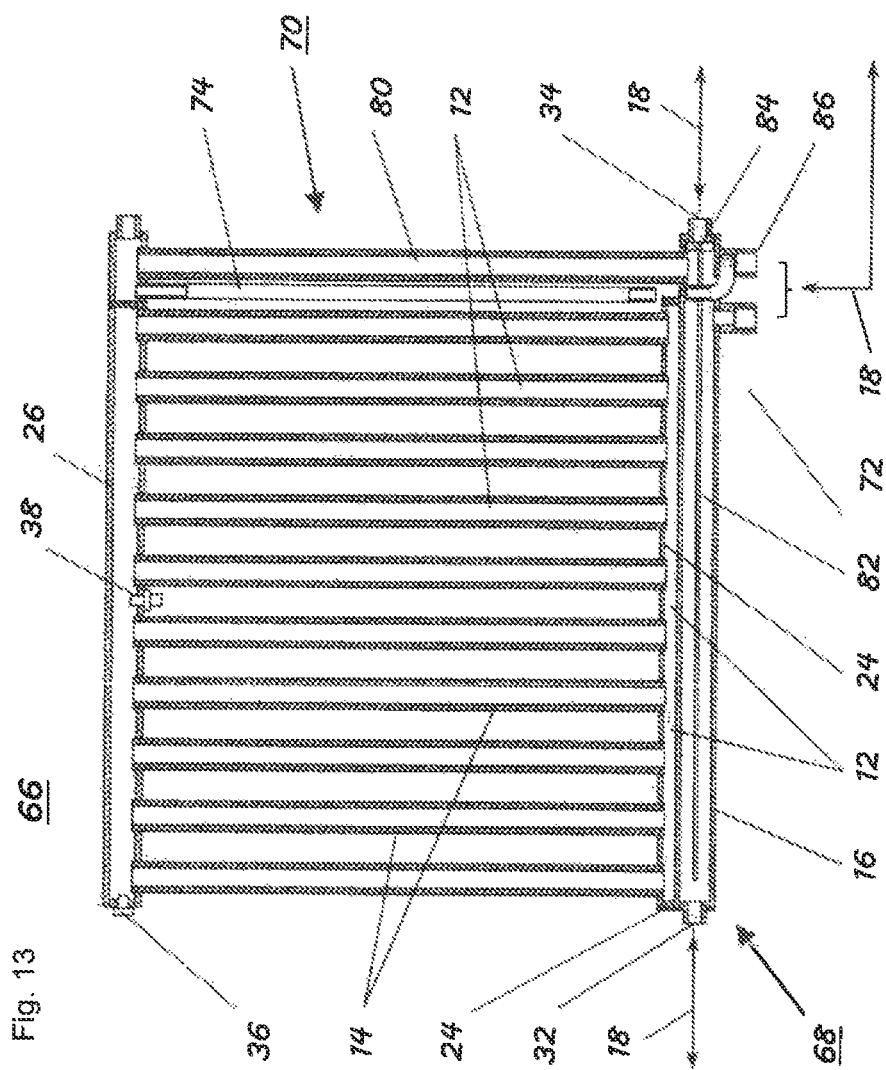
Figure 14A:
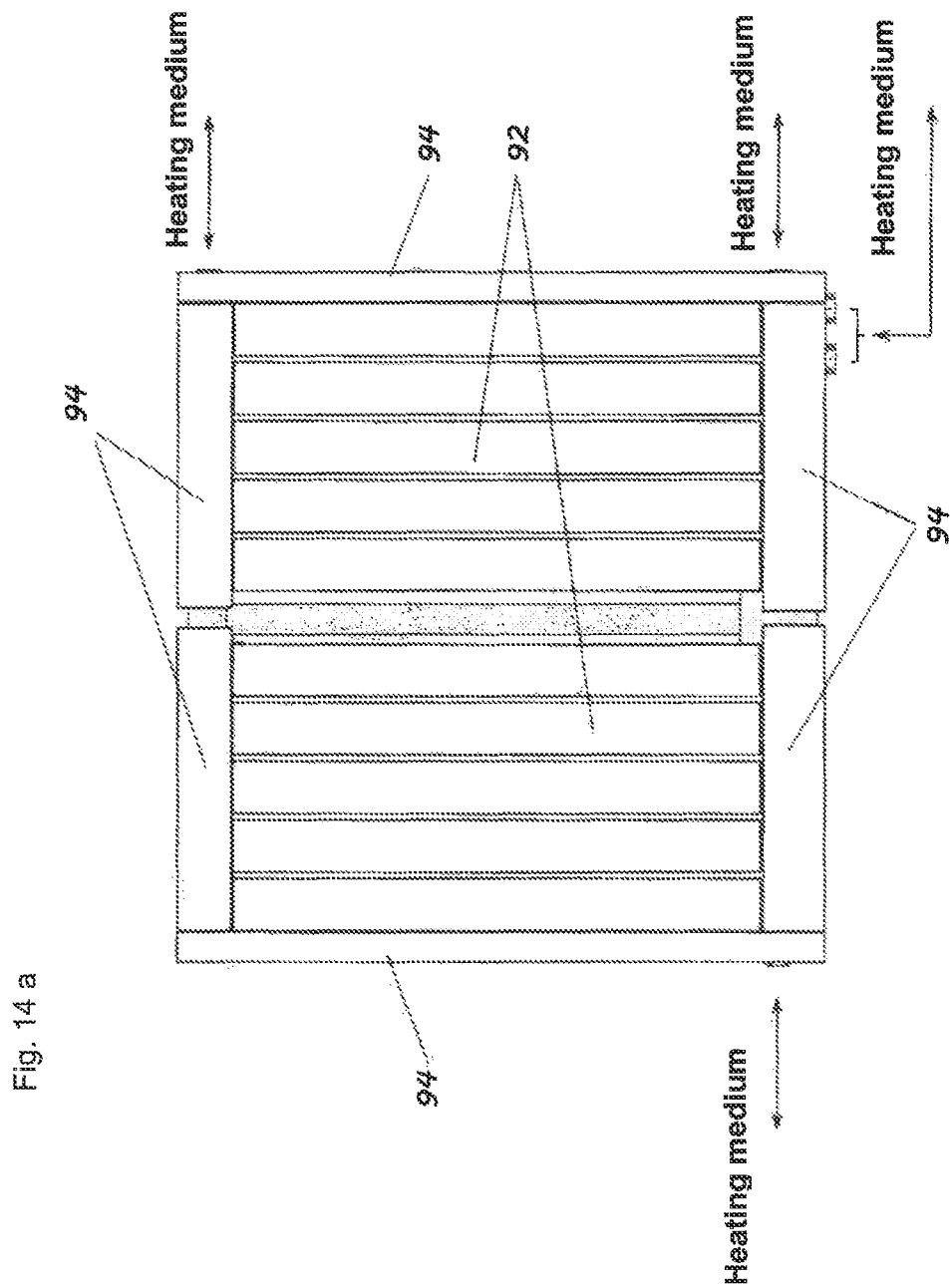
Figure 18:
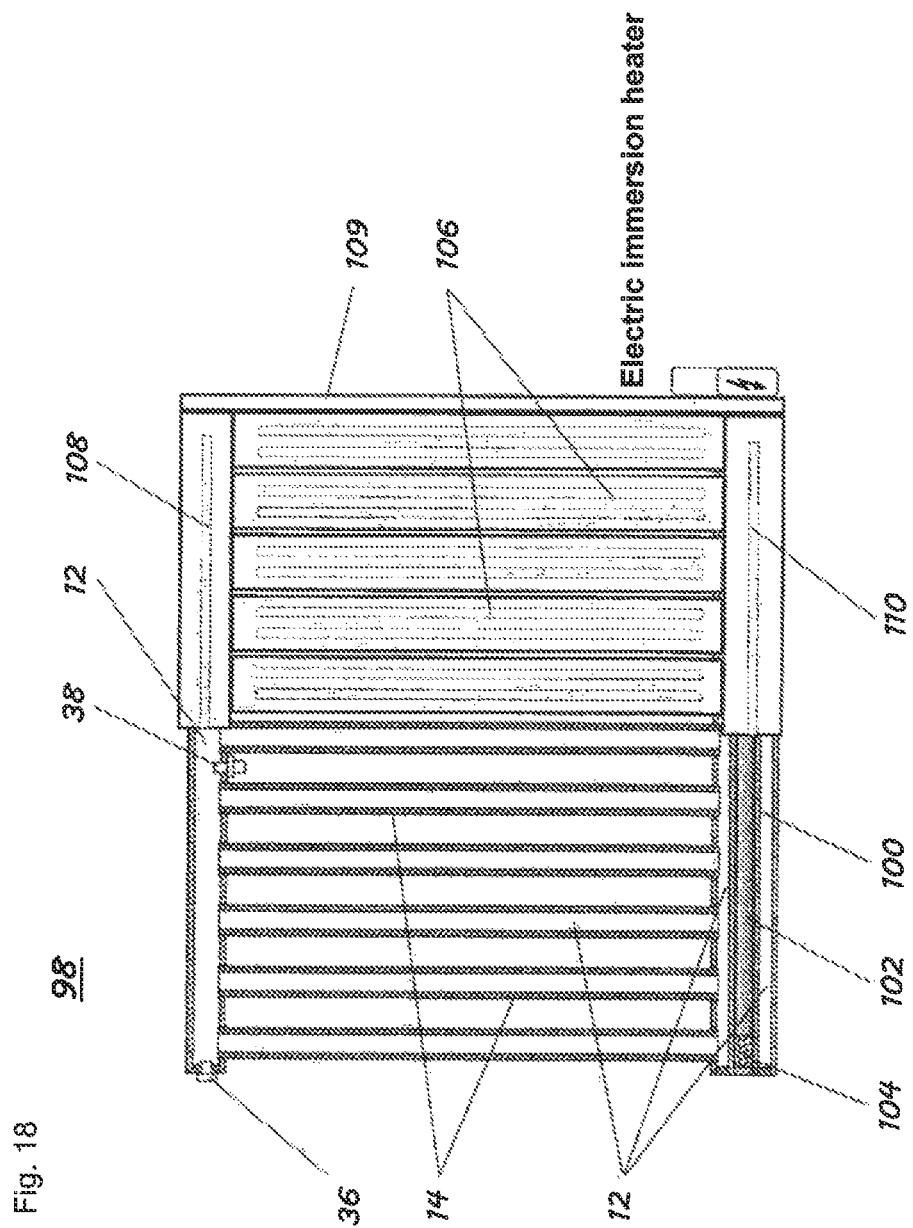
Figure 19:
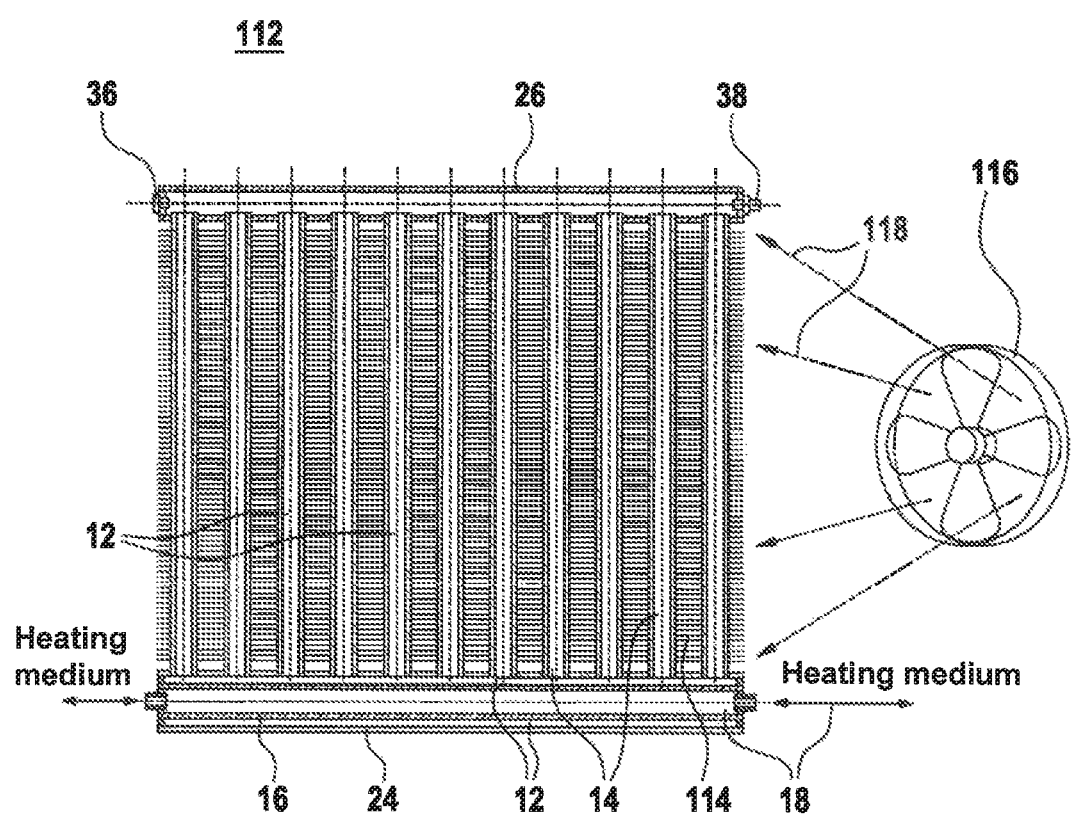
Figure 23A:
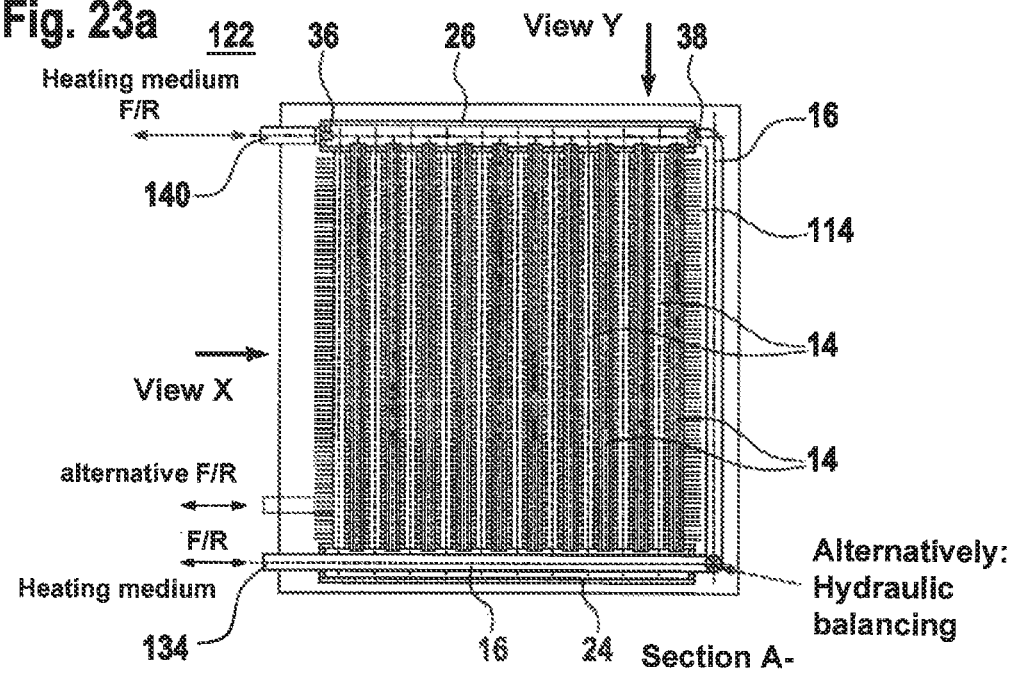
Figure 23B:
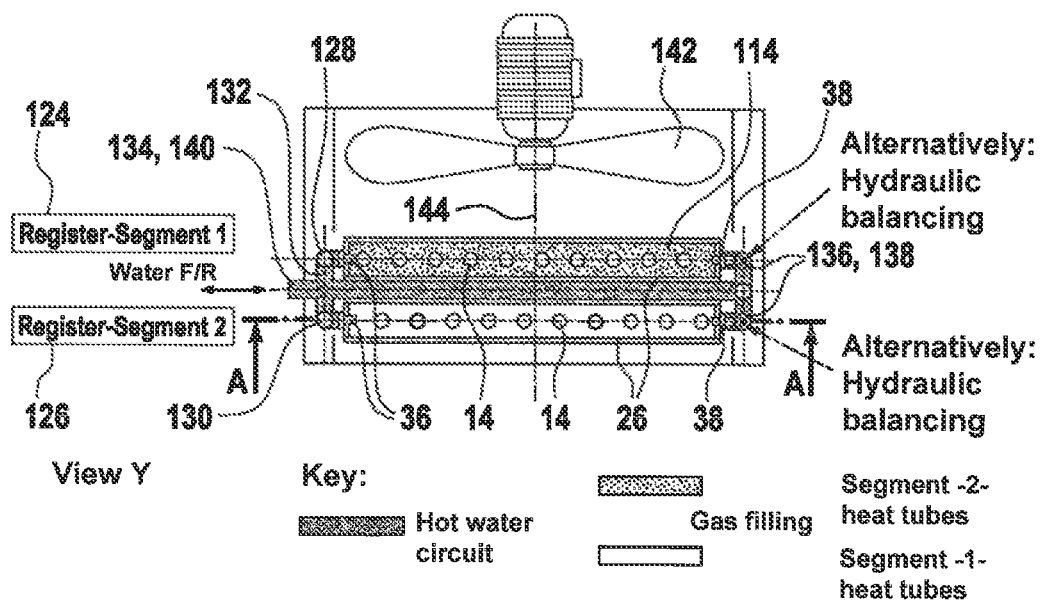

FIGS. 23a to 23c show in each case different views of a heating register 122, consisting of two parallel-connected heaters 112 according to FIG. 19. In accordance with FIG. 23a, the heating register 122 comprises a first heater segment 124 and a second heater segment 126, the heating tubes 16 being connected parallel. To do so, it is provided that connectors 128, 130 are connected jointly to a flow connector 134 via a connecting element 132. On the output side, outlet connectors 136, 138 are connected to a connector 140 via a tube connection. The connection system also works when connection 140 is the flow and connection 134 the return.

Figure 20:
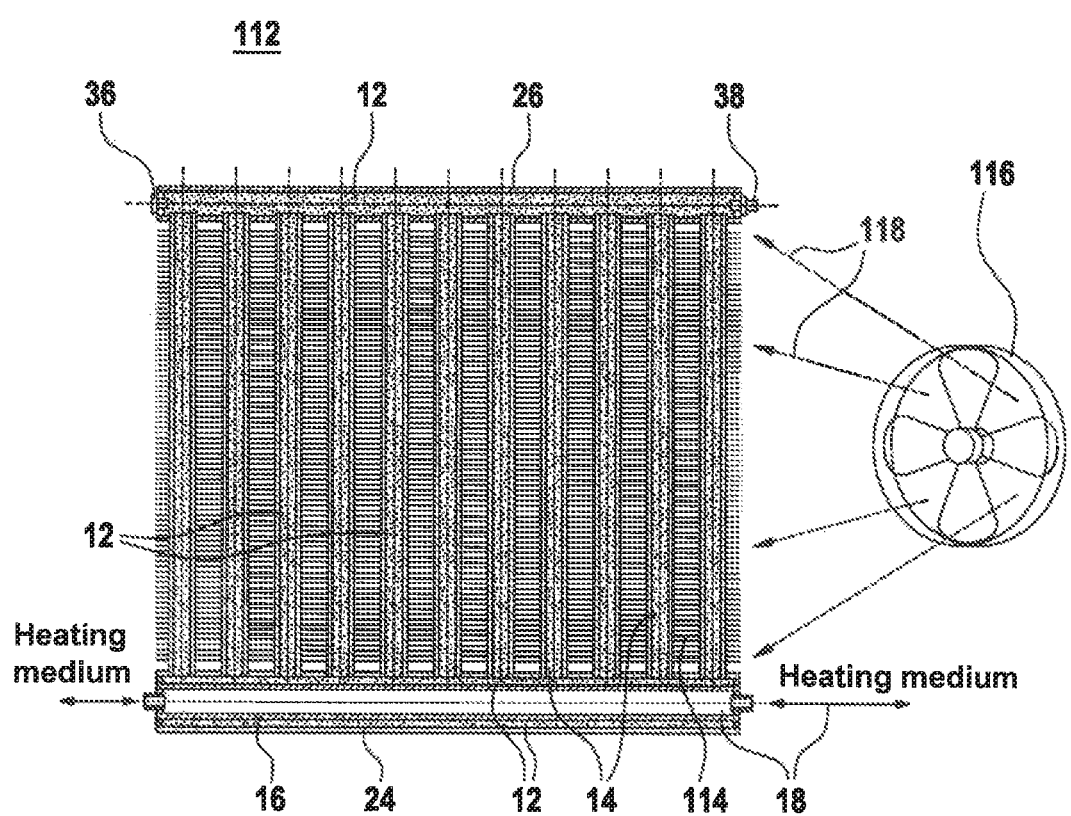
FIG. 20 shows the heater 112 according to FIG. 19 filled with working medium 12, shown in gray.
Figure 21:
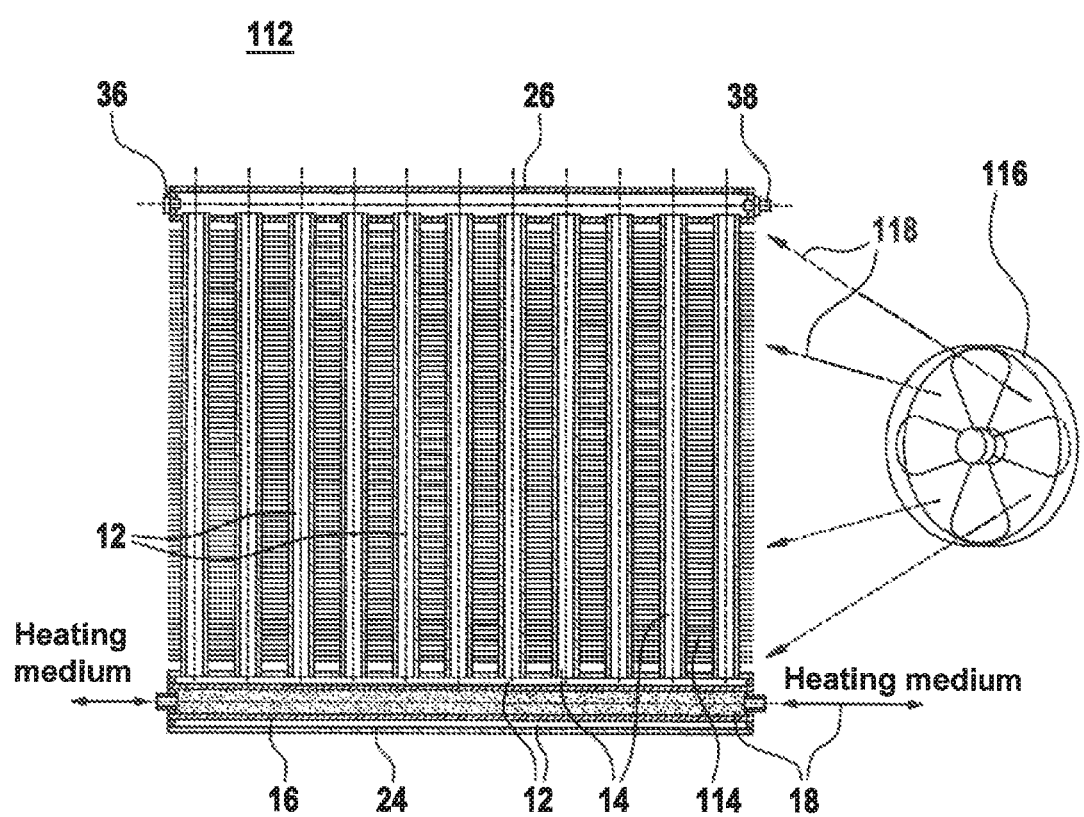
FIG. 21 shows the heater 112 according to FIG. 19 filled with heating medium, such as water 18, shown in gray.

The heating register segments 124, 126 have a structure corresponding substantially to the structure of the heater 112 as described in relation to FIGS. 19 to 21.

Furthermore, a fan 142 is provided whose longitudinal axis 144 extends substantially at right angles to a plane formed by the segments, so that an air flow can be generated through the opening between the fins 114.

FIG. 24 shows purely schematically a principle of flow through the heating register 122 in a simplified view. The heat tubes 14 of the heating register segments 124, 126 are each in fluidic connection to the transverse connection tubes 24, 26. The heating tubes 16, which in the example shown carry water as the heating medium, extend coaxially to the transverse connection tubes 24. The latter are connected parallel on the inlet side and the outlet side to create a hydraulic balance. Alternatively, hydraulic balancing valves as shown can be additionally provided. It is also possible to connect in parallel further segments, as shown by a further transverse connection tube.

Figure 25C:
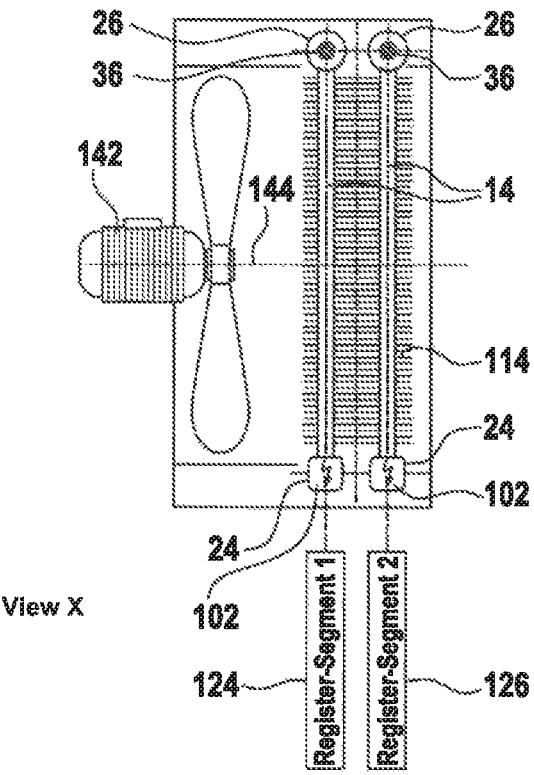

FIGS. 25a to 25c show an embodiment of a heater 122, according to FIG. 23 in different views, electric immersion heaters 102 being provided as the heating medium. The heating register comprises a first heater segment 124 and a second heater segment 126.

The heating register segments 124, 126 have a structure corresponding substantially to that of the heater 120 in FIG. 22, as described in relation to FIGS. 19 to 22.

The immersion heater connections are not restricted to the side shown in the figure, but can also be at the opposite tube ends, with the required fluid seals as described above.

Figure 26:
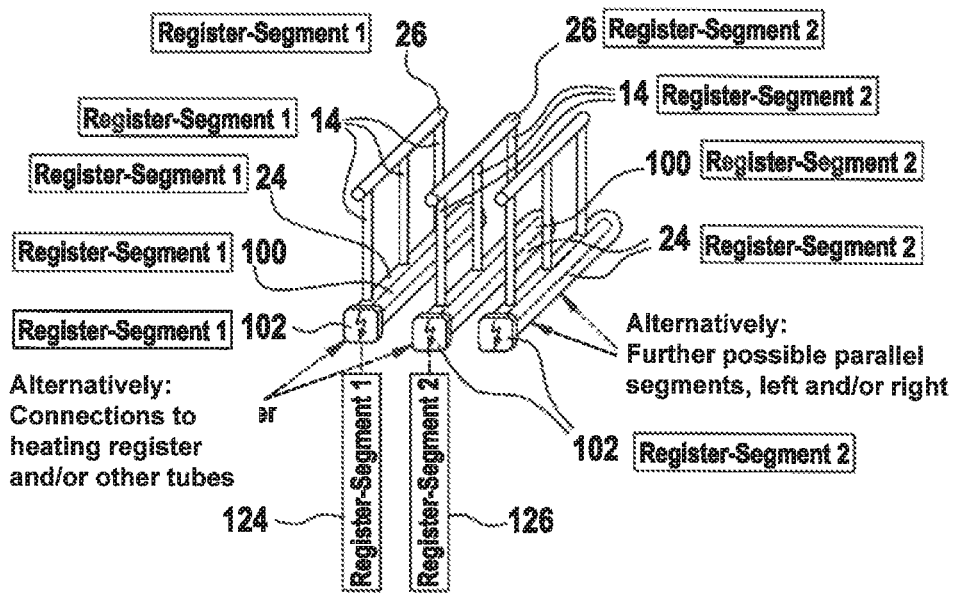

FIG. 26 shows purely schematically a principle of flow through the heating register 122 in a simplified view. The heat tubes 14 of the heating register segments 124, 126 are each in fluidic connection to the transverse connection tubes 24, 26. Tubes 100, which in the example shown receive the electric immersion heaters 102, extend coaxially to the transverse connection tubes 24. It is also possible to connect in parallel further segments, as shown by a further transverse connection tube.

Figure 27:
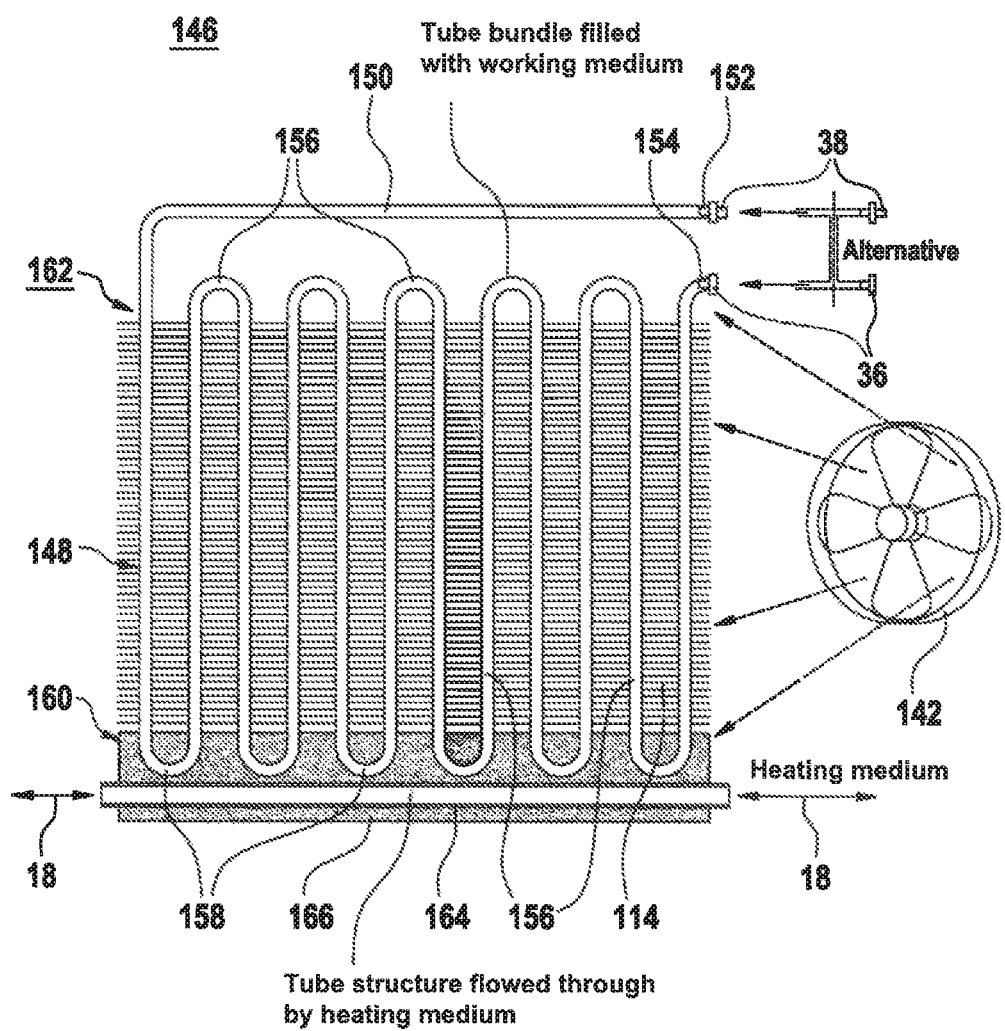

FIG. 27 shows a front view of a seventh embodiment of a heater 146 in the form of a meander-shaped heat tube bundle 148 which is filled with a working medium 150 and is sealed fluid-tight at its ends 152, 154. Parallel tube sections 156 of the tube bundle 148 form heat tubes, while first curved tube sections 158 form an evaporator 160 and second curved tube sections 156 a condenser 162.

Those tube sections 158 which act as evaporators are thermally coupled to a heat source 164, such as a heating tube. In the present case, the heating tube 164 extends inside a heat-conducting body 166 made from a heat transfer medium, such as aluminum or copper or advantageous thermally conductive material. The heating tube 164 is flowed through by the heating medium 18, such as water, to transfer heat to the tube sections 158.

A safety valve 38 is preferably arranged at the end of the tube section 152, and a filling valve 36 at the end of the tube bundle 154. The design also allows any other advantageous position of the safety valve 38 and filling valve 36 or the cavities filled with working medium. If technical guidelines so require, an advantageous safety encapsulation of the valve 38 is provided.

Alternatively, the ends 152 in front of the safety valve 38, and the ends 154 in front of the filling valve 36 can also be connected to one another by a tube section, so that a closed tube structure is obtained. This allows improvement of the effective distribution of the working medium inside the cavity enclosed by the tube bundle.

Figure 28:
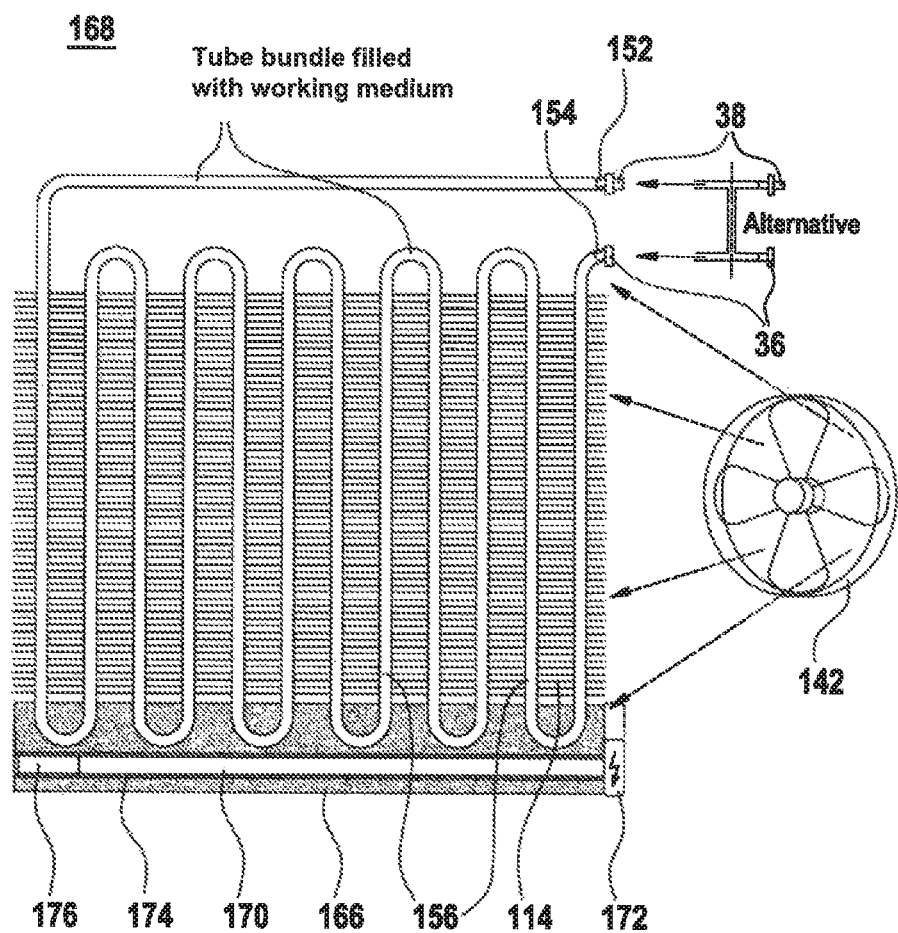

FIG. 28 shows a further embodiment of a heater 168 according to FIG. 27, the heat source being designed as an electric immersion heater 170 with connection 172. The electric immersion heater 170 extends in an opening 174 in the heat-conducting body 166. For better heat transfer, a heat-conducting agent 176 is provided at the transition between the electric immersion heater 170 and the heat-conducting body 166.

The immersion heater connection is not restricted to the side shown in the figure, but can also be at the opposite tube end, with the required fluid seals as described above.

FIGS. 29 *a* to *f* show in various views an embodiment of a heater 178 on the basis of the heater 146 according to FIG. 27. FIG. 29 *a*) shows a front view in section. FIG. 29 *b*) shows a plan view of the heater 178. FIG. 29 *c*) shows a plan view in section along section A-A of FIG. 29 *a*). FIG. 29 *d*) shows a plan view in section along section C-C of FIG. 29 *a*). FIG. 29 *e*) shows a side view in section along section B-B of FIG. 29 *c, d*) and FIG. 29 *f*) shows a side view from the right of a connecting flange.

FIG. 29 *a*) shows a front view of the heater 178. The curved tube sections 158 are thermally coupled in a common heat-conducting body 180. Heating tubes 182, 184, 186, 188 extend parallel to the curved tube sections 158, as shown in the side view according to FIG. 29 *e*).

The heating tubes have at one end connecting pieces 190, 192, 194, 196, and at the other end 198, 200, 202, 204, which advantageously open up into a common flange 206, 208 respectively. The heating tubes are connected in parallel. The flow/return connections are independent of the flow direction of the heating medium.

FIGS. 30 *a*) to *e*) show views of an embodiment of a heater 210, which corresponds substantially to the heater 178 according to FIGS. 29 *a*) to *e*), with the difference that electric immersion heaters 212, 214, 216, 218 are used as the heat source instead of the tubes 182, 184, 186, 188 flowed through by the heating medium, water.

The immersion heater connections are not restricted to the side shown in the figure, but can also be at the opposite tube ends, with the required fluid seals as described above.

FIGS. 31 *a*) to *f*) show views of an embodiment of a heater 220, which corresponds substantially to the heater 178 according to FIGS. 29 *a*) to *e*), with the difference that the ends 190, 192, 194, 196; 198, 200, 202, 204 of the heat tubes 182, 184, 186, 188 do not open up into the common flange 206, 208, but two ends 190, 192; 194, 196 and 198, 200; 202, 204 open up into a separate tube flange 222, 224 respectively. The heating tubes are connected in parallel. The flow/return connections are independent of the flow direction of the heating medium.

FIGS. 32 *a*) to *f*) show views of an embodiment of a heater 226, which corresponds substantially to the heater 178 according to FIGS. 29 *a*) to *e*), with the difference that the ends 190, 192, 194, 196; 198, 200, 202, 204 of the heat tubes 182, 184, 186, 188 do not open up into the common flange 206, 208, but are connected in series by means of connections 228, 230.

The flange connection 230 is not restricted to the side shown in the figure, but can also be at the opposite tube end. The flow/return connections are independent of the flow direction of the heating medium.

The invention claimed is:

1. A heater comprising:
    several heat tubes filled with a working medium, extending preferably parallel or parallel, and each having a first end and a second end, and
    a heat source thermally coupled to the first or second ends of the heat tubes,
    wherein the first ends of the heat tubes are open and fluidically connected to a first transverse connection tube,
    wherein the second ends of the heat tubes are open and fluidically connected to a second transverse connection tube,
    wherein the heat tubes and the transverse connection tubes form a common cavity filled with the working medium,
    wherein the first transverse connection tube is thermally coupled to the heat source to receive heat from the heat source,
    wherein the heat source is a heating tube through which a gaseous or liquid heating medium can flow, the heating tube being arranged coaxially in the first transverse connection tube along a longitudinal axis and being surrounded by the working medium, and
    wherein connectors of the heating tube are connected to the first transverse connection tube at an end face thereof, in a pressure-tight and fluid-tight manner; the heater has a connection system with a flow connection and a return connection, the flow connection being connected via a first bypass tube to a control valve which is coupled to a connector projecting at an end face from the second transverse connection tube; and a second bypass tube extends from the control valve preferably parallel to the first bypass tube, is in fluidic connection to the heating tube and is coupled to the return connection.

2. The heater according to claim 1, wherein the heat tubes are arranged parallel to one another and extend vertically in the operating position.

3. The heater according to claim 1, wherein the heat tubes are configured as gravity heat tubes.

4. The heater according to claim 1, wherein the working medium is a commercially available and freely accessible refrigerant and/or refrigerant mix (zeotropic mix), with a GWP (Global Warming Potential) value below 2500 or a GWP value below 750 from the group HFCs and/or PFCs and/or suitable refrigerants.

5. The heater according to claim 1, wherein the first, lower transverse connection tube forms an evaporator for the working medium.

6. The heater according to claim 1, wherein planar heat-radiating elements extending along the individual heat tubes or the bypass tubes, and are arranged in one plane.

7. The heater according to claim 1, wherein the heating tube extends preferably parallel or parallel to the first or second transverse connection tube and is thermally connected thereto.

8. The heater according to claim 1, wherein a flow separating device for regulating the flow rate of the heating medium, such as water, is arranged in the heating tube.

9. The heater according to claim 1, wherein the flow separating device extends coaxially in the longitudinal direction of the heating tube from an aperture arranged in an end-face opening of the heating tube, and a connection type of the heater is presettable by means of the aperture.

* * * * *